(12) United States Patent
Hayashi et al.

(10) Patent No.: US 8,670,058 B2
(45) Date of Patent: Mar. 11, 2014

(54) SOLID-STATE IMAGING APPARATUS, IMAGING SYSTEM, AND DRIVING METHOD OF IMAGING APPARATUS

(75) Inventors: Hidetoshi Hayashi, Fujisawa (JP); Shintaro Takenaka, Yokohama (JP); Kazuhiro Sonoda, Yokohama (JP); Yukihiro Kuroda, Kunitachi (JP); Koichiro Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1080 days.

(21) Appl. No.: 12/694,827

(22) Filed: Jan. 27, 2010

(65) Prior Publication Data

US 2010/0201856 A1    Aug. 12, 2010

(30) Foreign Application Priority Data

Feb. 6, 2009 (JP) ................................ 2009-026378

(51) Int. Cl.
*H04N 5/335* (2011.01)

(52) U.S. Cl.
USPC ............ 348/296; 348/302; 348/320; 348/322

(58) Field of Classification Search
USPC .................................. 348/296, 302, 320, 322
See application file for complete search history.

(56) References Cited

U.S. PATENT DOCUMENTS

| | | | | |
|---|---|---|---|---|
| 2002/0030152 A1* | 3/2002 | Afghahi | ..................... | 250/208.1 |
| 2005/0105836 A1* | 5/2005 | Gomi et al. | ................... | 384/302 |
| 2008/0024634 A1 | 1/2008 | Takenaka | ..................... | 348/307 |
| 2008/0029787 A1 | 2/2008 | Watanabe et al. | ............. | 257/233 |
| 2008/0036884 A1 | 2/2008 | Hayashi | ........................ | 348/250 |
| 2008/0225145 A1 | 9/2008 | Sonoda | .......................... | 348/294 |
| 2008/0291290 A1 | 11/2008 | Sonoda et al. | .............. | 348/222.1 |
| 2008/0303930 A1 | 12/2008 | Kuroda et al. | ................ | 348/308 |
| 2009/0008684 A1 | 1/2009 | Kuroda | .......................... | 257/292 |
| 2009/0122172 A1* | 5/2009 | Iwata et al. | ................... | 348/302 |
| 2009/0167914 A1 | 7/2009 | Itano et al. | .................... | 348/301 |
| 2009/0200449 A1 | 8/2009 | Iwata et al. | ................... | 250/206 |
| 2009/0212336 A1 | 8/2009 | Iwata et al. | ................... | 257/292 |
| 2009/0219420 A1 | 9/2009 | Kuroda | ......................... | 348/281 |
| 2009/0219424 A1 | 9/2009 | Sonoda et al. | ............... | 348/302 |
| 2009/0256936 A1 | 10/2009 | Sonoda et al. | ............... | 348/294 |
| 2009/0256939 A1 | 10/2009 | Sonoda | ......................... | 348/302 |
| 2009/0262210 A1 | 10/2009 | Sonoda | ....................... | 348/222.1 |
| 2009/0273697 A1 | 11/2009 | Sonoda | ......................... | 348/302 |
| 2010/0085458 A1 | 4/2010 | Horiguchi | ..................... | 348/308 |

FOREIGN PATENT DOCUMENTS

| | | |
|---|---|---|
| JP | 2005-184358 A | 7/2005 |
| JP | 2010-093363 A | 4/2010 |

* cited by examiner

*Primary Examiner* — Twyler Haskins
*Assistant Examiner* — Quang Le
(74) *Attorney, Agent, or Firm* — Fitzpatrick, Cella, Harper & Scinto

(57) ABSTRACT

The present invention reduces differences in the influence of electric charge leakage from a non-read out region into multiple read out regions adjacent to a non-read out region. Reset scanning of that row in the non-read out region which adjoins the first or second read out region is started before read out scanning of the first and second read out regions.

21 Claims, 24 Drawing Sheets

SOLID-STATE IMAGING APPARATUS, IMAGING SYSTEM, AND DRIVING METHOD OF IMAGING APPARATUS

BACKGROUND OF THE INVENTION

1. Field of the Invention

The present invention relates to a solid-state imaging apparatus, an imaging system, and a driving method of the imaging apparatus.

2. Description of the Related Art

Solid-state imaging apparatuses are used as image sensors for digital still cameras and digital video camcorders. Functions required of such imaging systems include an electronic zoom function which selectively reads only part of an imaging region and thereby zooms in or out on an image.

In the solid-state imaging apparatus, electric charges accumulated in photoelectric converting units of the pixels are discharged when signals are read from pixels. However, in the case of pixels from which signals are not read (hereinafter referred to as non-read out pixels), since the electric charges accumulated in the photoelectric converting units are not discharged, electric charges in excess of saturation charge capacity of the photoelectric converting units may overflow from the photoelectric converting units. The electric charges overflowing from the photoelectric converting unit will leak to adjacent pixels via a semiconductor substrate and may produce pseudo signals in pixels from which signals are read (hereinafter referred to as read out pixels). This phenomenon is known as blooming. To address this concern, Japanese Patent Application Laid-Open No. 2005-184358 proposes to reset non-read out pixels during a communications period or frame read out period in the case of a trim scan.

SUMMARY OF THE INVENTION

Generally, pixels whose photoelectric converting units are shielded (hereinafter referred to as Optical Black pixels: OB pixels) are provided on a peripheral side of an imaging apparatus to correct reference levels of signals. Since the OB pixels are used for correction, in the case of a trim scan, signals are read out not only from regions intended for signal read out (hereinafter referred to as read out regions), but also from the OB pixels. Also, in an application in which a moving image is displayed in an electronic viewfinder of a camera serving as an imaging system, it is sometimes necessary to use skipped read out which involves reading out signals from every two or more rows in an imaging region to improve frame rate. That is, it is assumed that a non-read out region is provided adjacent to two read out regions.

Generally, since an imaging apparatus scans sequentially row by row, it is concerned that in the two read out regions adjacent to the non-read out region, the pixels in the rows adjoining the non-read out region will be influenced differently by the electric charges overflow from the non-read out region. Since this influence appears differently in each row, step-like irregularities can appear in a resulting image.

Japanese Patent Application Laid-Open No. 2005-184358 does not address the above concern in any way. In view of the above circumstances, an object of the present invention is to reduce differences in the influence of electric charge leakage from a non-read out region into read out region adjacent to the non-read out region in case that the non-read out region is arranged in adjacent to a plurality of readout regions.

To solve the above problem, according to a first aspect of the present invention, there is provided a solid-state imaging apparatus comprising: a pixel region wherein a plurality of pixels each including a photoelectric converting unit for photoelectric converting and a pixel output unit outputting a signal based on an electric charge accumulated in the photoelectric converting unit are arranged in a matrix; and a row selecting unit for selecting the pixels row by row, wherein the solid-state imaging apparatus further comprises a control unit for controlling an operation mode of the solid-state imaging apparatus, and the control unit executes an operation mode such that the signals are read out from a first read out region including the pixels of a plurality of rows, the signals are read out from a second read out region including the pixels of a plurality of rows, and the signals are not read out from a non-read out region including the pixels of a plurality of rows and adjacent to the first and second read out regions, and starts a reset scanning, during the operation mode, of a row in the non-read out region and adjacent to the first or second read out region, before a read out scanning of the first and second read out regions.

To solve the above problem, according to a second aspect of the present invention, there is provided a driving method of a solid-state imaging apparatus comprising: a pixel region wherein a plurality of pixels each including a photoelectric converting unit for photoelectric converting and a pixel output unit outputting a signal based on an electric charge accumulated in the photoelectric converting unit are arranged in a matrix, wherein the driving method comprises steps of: reading out the signals from a first read out region including the pixels along a plurality of rows, reading out the signals from a second read out region including the pixels along a plurality of rows, and without reading out the signals from a non-read out region including the pixels along a plurality of rows and adjacent to the first and second read out regions, during the reading out from the first or second read out region, starting a reset scanning of a row in the non-read out region and adjacent to the first or second read out region, before a read out scanning of the first and second read out regions.

The present invention enables reducing differences in the influence of electric charge leakage from a non-read out region into multiple read out regions adjacent to the non-read out region.

Further features of the present invention will become apparent from the following description of exemplary embodiments with reference to the attached drawings.

DESCRIPTION OF THE EMBODIMENTS

First Embodiment

Figure 1:
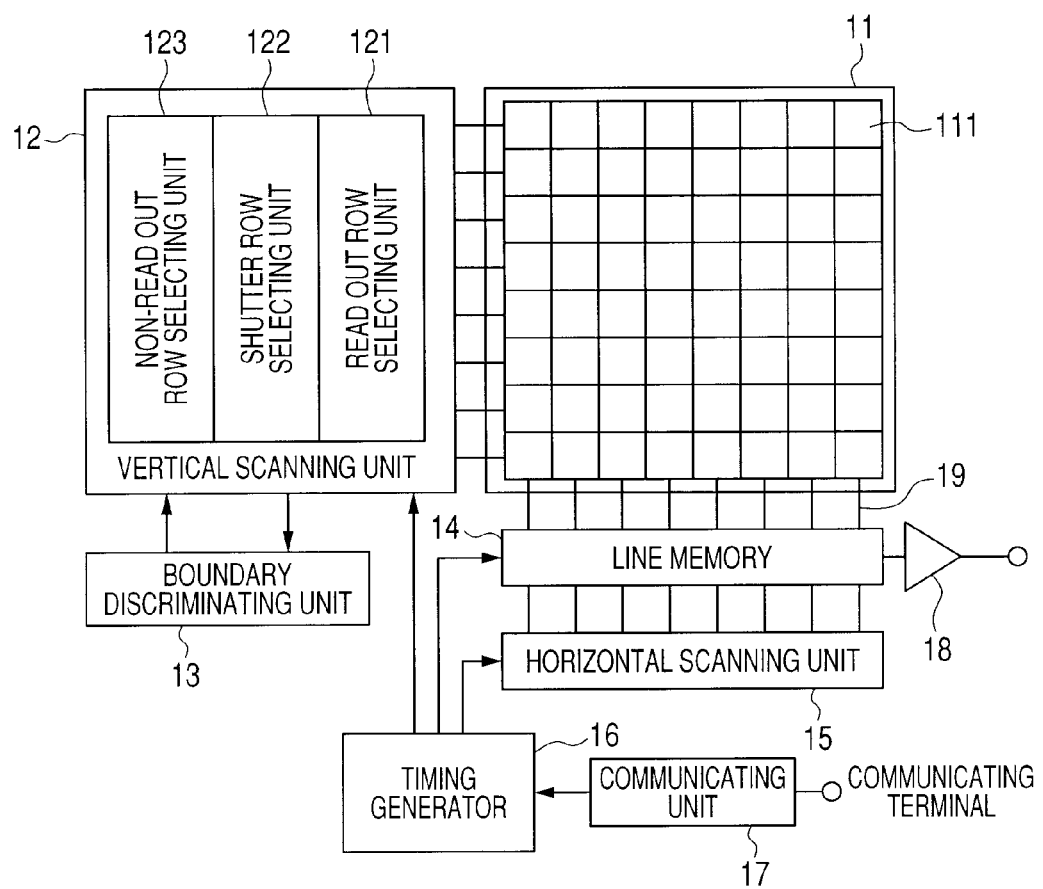
FIG. 1 is a diagram illustrating a configuration example of a solid-state imaging apparatus to which the present invention is applicable.

FIG. 1 is a diagram schematically illustrating a configuration example of a solid-state imaging apparatus to which the present invention is applicable. The solid-state imaging apparatus 1 includes a pixel unit 11, a vertical scanning unit 12, a boundary discriminating unit 13, a line memory 14, a horizontal scanning unit 15, a timing generator 16, a communicating unit 17, an amplifier 18 and vertical signal lines 19.

Figure 2:
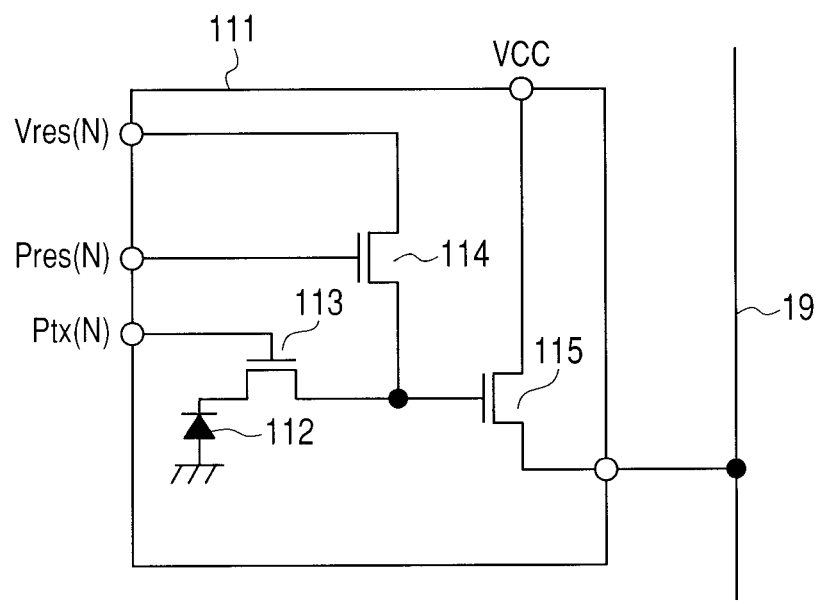
FIG. 2 is an equivalent circuit diagram of a pixel in the solid-state imaging apparatus to which the present invention is applicable.

Pixels 111 are arranged in a matrix in the pixel unit 11. FIG. 2 illustrates a configuration example of the pixel 111. A pixel in the nth row will be described here by way of example. A photo diode (hereinafter referred to as a PD) 112 which is a photoelectric converting unit is connected to a gate terminal of an amplifier transistor 115 which is a pixel output unit via a transfer transistor 113 which is a transfer unit. The PD 112 is also connected to a source terminal of a reset transistor 114 which is a pixel reset unit via the transfer transistor 113. A drain terminal of the reset transistor 114 is connected to a power supply Vres. The power supply Vres is configured to be switchable to supply High (Vres_H) and Low (Vres_L) selectively. A source terminal of the amplifier transistor 115 is connected to a vertical signal line 19. A signal Ptx(N) supplied to the transfer transistor 113 and a signal Pres(N) supplied to the reset transistor 114 are provided by the vertical scanning unit 12. The subscript (N) attached to the signal names means that the pixel is located in the Nth row.

The vertical scanning unit 12 is included as part of a control unit which controls operation of the solid-state imaging apparatus. The vertical scanning unit 12 includes a read out row selecting unit 121, shutter row selecting unit 122 and non-read out row selecting unit 123. The read out row selecting unit 121, which is used to select a read out row from the pixel unit 11, selects pixels row by row from the pixel unit 11 using the read out row selecting unit 121 and thereby outputs signals from the pixels to the vertical signal lines 19. The shutter row selecting unit 122 selects pixels row by row from the pixel unit 11 and makes the selected pixels perform a pixel reset operation. The pixel reset operation is the operation of discharging electric charges accumulated in the PD 112 to a power supply VCC. The operation of selecting rows of pixels (hereinafter referred to as pixel rows) using the shutter row selecting unit 122 is performed prior to the operation of selecting pixel rows using the read out row selecting unit 121, and the end of the pixel reset operation corresponds to the start of accumulation time for the PDs 112. During a trim scan or skipped read out, the non-read out row selecting unit 123 selects pixels row by row from non-selected rows and makes the selected pixels perform a pixel reset operation.

The boundary discriminating unit 13, which is included in the control unit, determines whether a row of pixels selected by the shutter row selecting unit 122 is adjacent to a non-read out row and controls the vertical scanning unit based on results of the determination.

The line memory 14, which is a pixel signal storage unit, temporarily holds signals output, via the vertical signal line 19, from the pixels 111 selected by the read out row selecting unit 121.

The horizontal scanning unit 15 scans the line memory 14 and thereby outputs the signals held in the line memory 14, via the amplifier 18.

The timing generator 16 generates pulses based on a synchronizing signal or on a signal received from the communicating unit 17 and drives the vertical scanning unit 12, line memory 14 and horizontal scanning unit 15 using the generated pulses. Incidentally, the timing generator 16 may be installed on the same substrate as, or different substrate from, the pixel unit 11.

Figure 3:
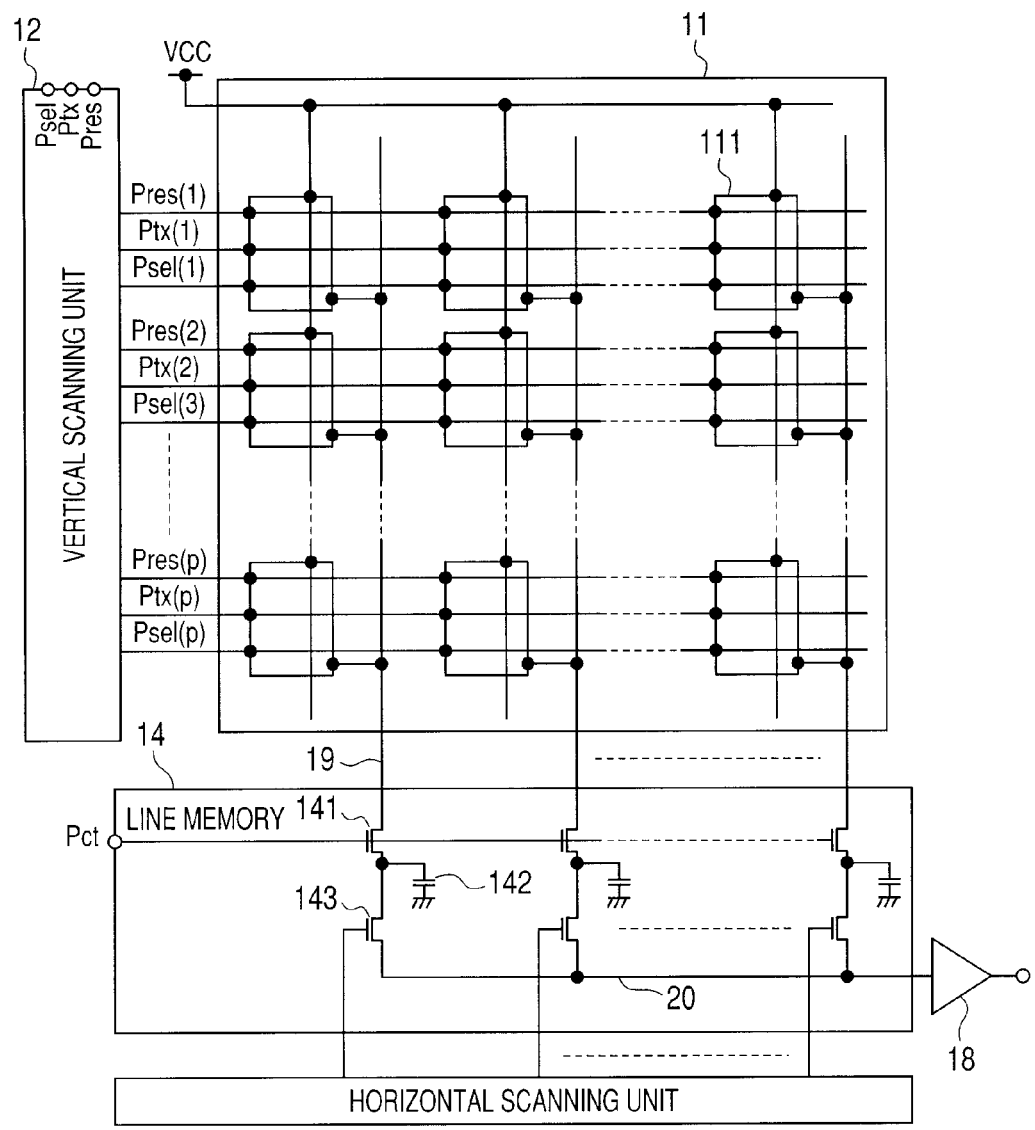
FIG. 3 is a diagram illustrating part of the solid-state imaging apparatus to which the present invention is applicable.

FIG. 3 is a diagram schematically illustrating the pixel unit 11, vertical scanning unit 12, line memory 14, horizontal scanning unit 15 and amplifier 18 extracted from the solid-state imaging apparatus 1 illustrated in FIG. 1. The line memory 14 includes write transistors 141, capacitors 142 and read transistors 143 associated with the vertical signal lines 19. The signal write transistors 141 are turned on and off under control of a signal Pct supplied from the timing generator 16. On the other hand, the read transistors 143 are turned on when selected in sequence by the horizontal scanning unit 15 which is, for example, a shift register, and consequently, the signals held in the capacitors 142 are output to a horizontal signal line 20.

Figure 4:
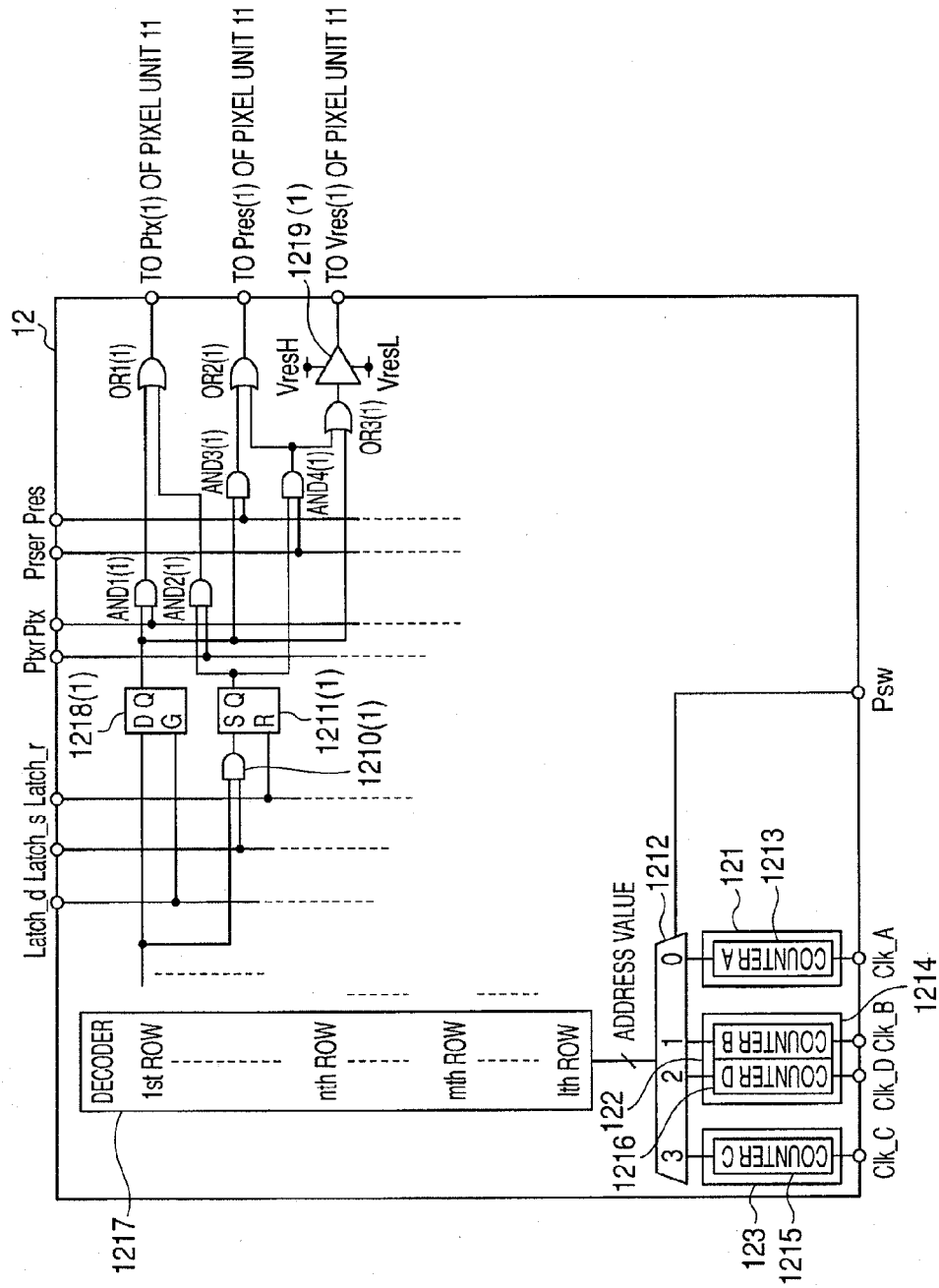
FIG. 4 is a diagram illustrating a configuration example of a vertical scanning unit of the solid-state imaging apparatus to which the present invention is applicable.

FIG. 4 is a diagram illustrating a configuration example of the vertical scanning unit 12 according to the present embodiment. The read out row selecting unit 121 includes a counter A, the shutter row selecting unit 122 includes counters B and D, and the non-read out row selecting unit 123 includes a counter C. Outputs of the counters A to D are connected to a selector 1212 and the output of the counter selected by a signal Psw is input in a decoder 1217 as an address value. The counters A to D and selector 1212 operate as an address generating unit and supply the address value as an address signal to the decoder 1217. The decoder 1217 selects a bit, i.e., a row, corresponding to the address signal from the address generating unit.

The vertical scanning unit 12 further includes an AND circuit 1210(N), D latch 1218 (N), SR latch 1211(N) and buffer 1219(N). The D latch 1218(N) and SR latch 1211(N)

operate as storage units which store the bits selected by the decoder 1217. Symbol (N) means that the units are related to the pixels in the Nth row. The symbol is also used hereinafter.

The AND circuit 1210(N) supplies the logical product of an output signal from the decoder 1217 and a signal Latch_s to an S terminal of the SR latch 1211. The SR latch 1211 receives a signal Latch_r at an R terminal. On the other hand, the D latch 1218(N) receives an output signal from the decoder 1217 at a D terminal, and a signal Latch_d at a G terminal. Outputs of the D latch 1218(N) are connected to an AND circuit AND1(N) which outputs a logical product with the signal Ptx, an AND circuit AND3(N) which outputs a logical product with the signal Pres, and an OR circuit OR3 (N). Outputs of the SR latch 1211(N) are connected to an AND circuit AND2(N) which outputs a logical product with a signal Ptxr and an AND circuit AND4(N) which outputs a logical product with a signal Presr. Both the outputs of the AND circuit AND1(N) and AND circuit AND2(N) are connected to an OR circuit OR1, and the logical sum of the two outputs is supplied as the signal Ptx(N) to the pixel unit. The outputs of the AND circuit AND3(N) and AND circuit AND4 (N) are connected to an OR circuit OR2(N), and the logical sum of the two outputs is supplied as the signal Pres(N) to the pixel unit. Also, the outputs of the D latch 1218(N) and the AND circuit AND4(N) are connected to the OR circuit OR3, and the logical sum of the two outputs controls the buffer 1219(1). In the configuration illustrated in FIG. 4, the OR circuit OR1(1), OR circuit OR2(2) and buffer 1219(1) operate as a pixel driving unit which supplies signals to pixels according to bits stored in the D latch 1218(N) and SR latch 1211(N).

Figure 5:
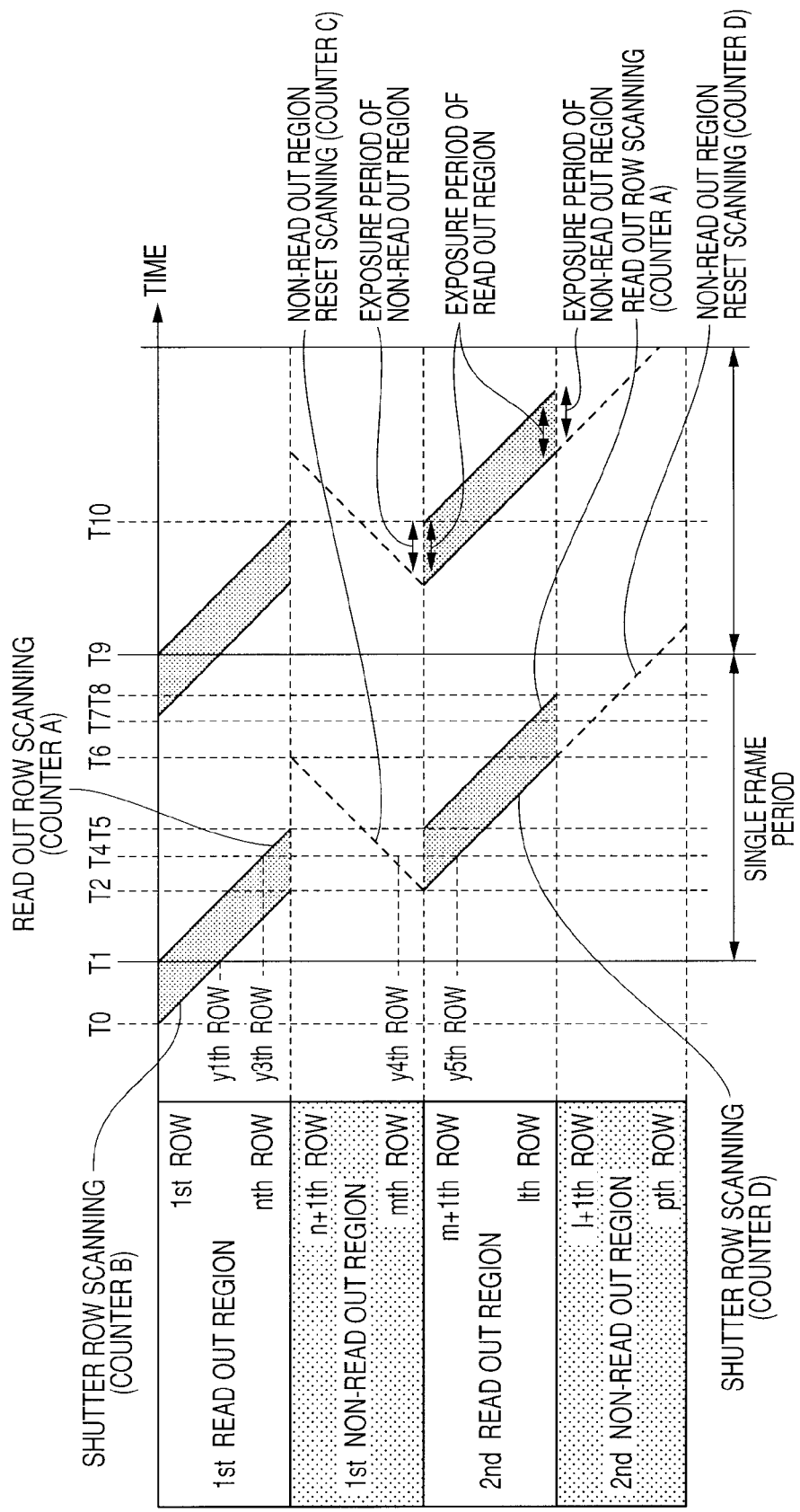
FIG. 5 is a conceptual operation diagram of a solid-state imaging apparatus according to a first embodiment.

Next, operation of the present embodiment will be described. FIG. 5 is a conceptual diagram illustrating operation of an operation mode in which only first and second read out regions are read out. In FIG. 5, the ordinate represents position in the pixel unit 11 and the abscissa represents time. The counters illustrated in FIG. 4 are also indicated in FIG. 5 in relation to various types of scanning including shutter scanning and read out scanning.

P rows of pixels in the pixel unit 11 will be described here. The first to nth rows make up a first read out region in which signals are read out of pixels. The first read out region contains, for example, OB pixels whose PDs are shielded. The n+1th to mth rows make up a first non-read out region in which signals are not read out of pixels. The m+1th to lth rows make up a second read out region. The l+1th to pth rows make up a second non-read out region.

In FIG. 5, a period from T1 to T9 will be described as one frame period. That is, in the example illustrated in FIG. 5, the interval from the time when read out scanning is started from the first row to the time when read out scanning is started from the first row again corresponds to one frame period.

At time T0, shutter scanning is started from the first row by the shutter row selecting unit 122. At time T1 when shutter scanning is performed in the y1th row, read out scanning is started from the first row by the read out row selecting unit 121. The period from T0 to T1 is an accumulation time for pixels in the first row.

When shutter scanning of the first read out region is finished, reset scanning of the first non-read out region and shutter scanning of the second read out region is started at time T2.

After read out scanning of the first read out region is finished, read out scanning of the second read out region is started at time T5. Since the period from time T2 to time T5 is equal to the period from time T0 to time T1, the accumulation times of the first and second read out regions are equal.

The reset scanning of the first non-read out region and shutter scanning of the second read out region are finished at time T6.

At time T7, shutter scanning of the first read out region is started again and at time T8, read out scanning of the first frame is finished. Then, at time T9, operation for the second frame is started and read out scanning of the first read out region is started. Incidentally, although in FIG. 5, the shutter scanning of the first read out region is started before the read out scanning of the second read out region is finished, the shutter scanning of the first read out region may be started after the read out scanning of the second read out region is finished.

Figure 6:
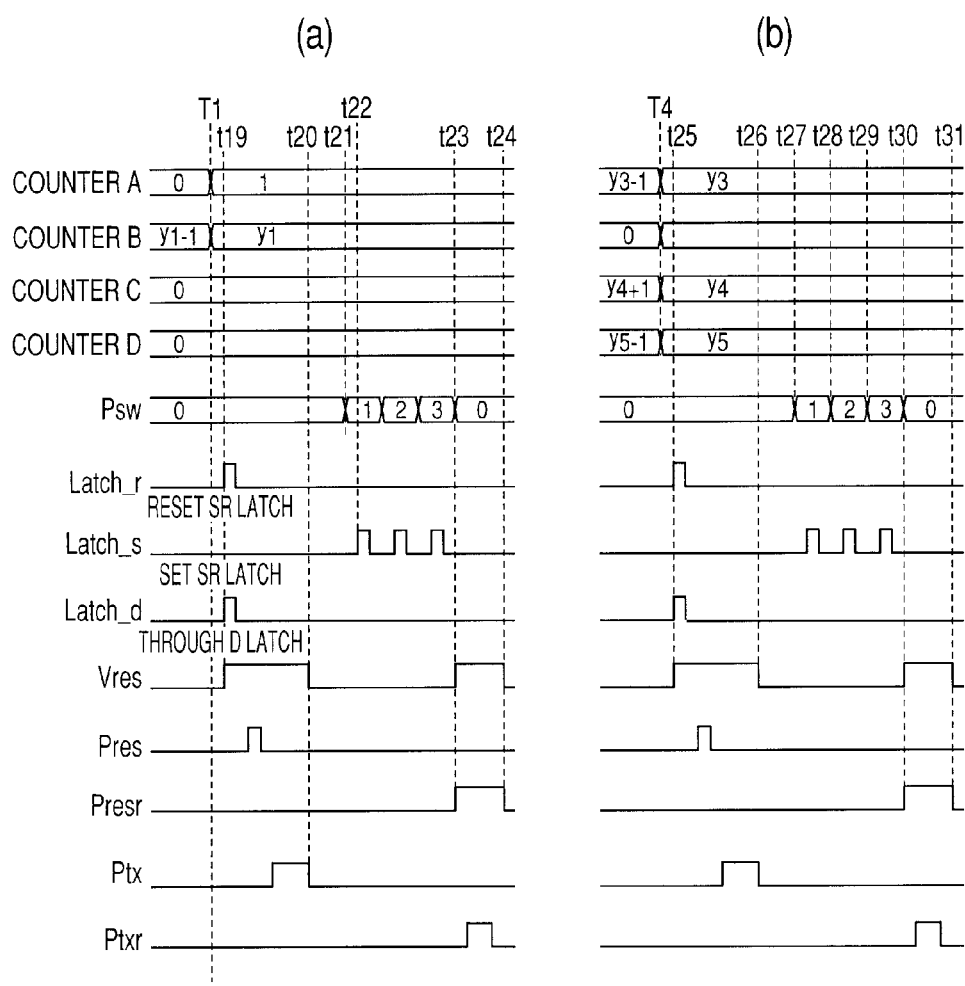
FIG. 6 shows an operation timing chart of the solid-state imaging apparatus according to the first embodiment.

FIG. 6 shows, in (a) and (b), timing chart for illustrating operations of the vertical scanning unit 12 according to the present embodiment in more detail. FIG. 6 illustrates, in (a), the operations started at time T1 in FIG. 5. And, FIG. 6 illustrates, in (b), the operations started at time T4 in FIG. 5.

As can be seen from FIG. 5, read out scanning of the first row and shutter scanning of the y1th row are started at time T1. At time T1 in (a) in FIG. 6, the counter A is incremented from 0 to 1 and the counter B is incremented from y1−1 to y1. At this point, the counters C and D indicate 0. Also, since the signal Psw is 0, the count value of the counter A is supplied as an address value from the selector 1212 to the decoder 1217.

Next, at time t19, the signals Latch_r and Latch_d become High and the power supply Vres is set to VresH. Consequently, an output Q of the D latch 1218(1) becomes High, causing the buffer 1219(1) to output VresH as Vres(1).

Subsequently, when the signal Pres becomes High, a signal Pres(1) is output via the OR circuit OR2(1). Consequently, the reset transistor 114 turns on, resetting the voltage level of the control electrode node (floating diffusion; hereinafter referred to as a FD) of the amplifier transistor to VresH.

Next, when the signal Ptx becomes High, a signal Ptx(1) is output via the OR circuit OR1(1). Consequently, the transfer transistors 113 turn on, causing the electric charges accumulated in the PDs 112 in the first row to be transferred to the FDs. Then, at time t20, the power supply Vres becomes Vres_L and the signal Ptx becomes Low.

As the signal Psw becomes 1 at time t21, the count value of the counter B is given from the selector 1212 to the decoder 1217. In this case, since the count value of the counter B is y1, the decoder 1217 performs operations related to the y1th row.

As the signal Latch_s becomes High at time t22, so does the output of an SR latch 1211_y1. Consequently, an address of the y1th row is set. Subsequently, the signal Psw becomes 2 and then to 3, and the signal Latch_s becomes High. However, since the count value of the counters C and D are 0, no row is selected.

At time t23, as the power supply Vres becomes Vres_H and the signals Pres and Ptxr become High, the vertical scanning unit 12 outputs signals Ptx_y1 and Pres_y1. Consequently, the transfer transistors 113 and reset transistors 114 turn on, causing a pixel reset operation to be performed in the y1th row.

Next, operations which start at T4 will be described with reference to (b) in FIG. 6. Read out scanning of the y3th row, reset scanning of the y4th row and shutter scanning of the y5th row are performed here.

At time T4, the counter A is incremented from y3−1 to y3, the counter C is decremented from y4+1 to y4, and the counter D is incremented from y5−1 to y5. The count value of the counter B is kept at 0.

At time t25, the signals Latch_r and Latch_d become High and the power supply Vres is set to VresH. Consequently, an output Q of a D latch 1218_y3 becomes High, causing a buffer 1219_y3 to output VresH as Vres_y3.

Subsequently, when the signal Pres becomes High, a signal Pres_y3 is output via the OR circuit OR2. Consequently, the reset transistor 114 turns on, resetting the voltage level of the FD to VresH.

Next, when the signal Ptx becomes High, a signal Ptx_y3 is output via the OR circuit OR1. Consequently, the transfer transistor 113 turns on, causing the electric charges accumulated in the PD 112 to be transferred to the FD. Then, at time t20, the power supply Vres becomes Vres_L and the signal Ptx becomes Low.

As the signal Psw becomes 1 at time t27, the count value of the counter B is given from the selector 1212 to the decoder 1217. In this case, since the count value of the counter B is 0, no row is selected.

As the signal Psw becomes 2 at time t28, the count value of the counter D is given from the selector 1212 to the decoder 1217. In this case, since the count value of the counter D is y5, the decoder 1217 performs operations related to the y5th row. Subsequently, as the signal Latch_s becomes High, so does the output of an SR latch 1211_y5. Consequently, an address of the y5th row is set.

As the signal Psw becomes 3 at time t29, the count value of the counter C is given from the selector 1212 to the decoder 1217. In this case, since the count value of the counter D is y4, the decoder 1217 performs operations related to the y4th row. Subsequently, as the signal Latch_s becomes High, so does the output of an SR latch 1211_y4. Consequently, an address of the y4th row is set.

As the signal Presr becomes High at time t30, so do signals Pres_y4 and Pres_y5. Furthermore, when the signal Ptxr becomes High, so do signals Ptx_y4 and Ptx_y5. Since the power supply ores is Vres_H, pixel reset operations are performed in the y4th and y5th rows.

According to the present embodiment, after shutter scanning of the first read out region is finished, reset scanning of the first non-read out region and shutter scanning of the second read out region need to be started. Now, a process of the boundary discriminating unit 13 which controls this timing will be described. In a flowchart in FIG. 11, first the boundary discriminating unit 13 determines whether the count value of the counter B has reached n. If the count value has not reached n, the boundary discriminating unit 13 repeats determination until the count value reaches n. When the count value of the counter B becomes equal to n at a certain time, the boundary discriminating unit 13 sets the counter C to the mth row, and the counter D to the m+1th row. Consequently, shutter scanning of the second read out region and reset scanning of the first non-read out region are started from appropriate locations.

As can be seen from FIG. 5, in the first frame, reset scanning of the first non-read out region is started before read out scanning of the second read out region adjacent to the first non-read out region. Furthermore, reset scanning of the pixels in the n+1th row is performed before read out scanning of the pixels in the nth row. Consequently, a difference in accumulation time between the nth row and n+1th row becomes closer to a difference in accumulation time between the mth row and m+1th row than when reset scanning of the non-read out region is performed in sequence from the n+1th row to the mth row. Thus, even if electric charges overflow from the pixels in the first non-read out region, the present embodiment can reduce differences in the influence of blooming among multiple read out regions adjacent to the first non-read out region.

In the operation example illustrated in FIG. 5, the reset scanning of the first non-read out region in the first frame is finished after the read out scanning in the first frame is finished. However, the reset scanning of the first non-read out region in the first frame may be set to be finished before the read out scanning in the first frame is finished.

A configuration in which each pixel 111 includes a PD 112, transfer transistor 113, reset transistor 114 and amplifier transistor 115 has been described above as an example. However, the present invention is not limited to the pixel configuration described above.

Figure 22:
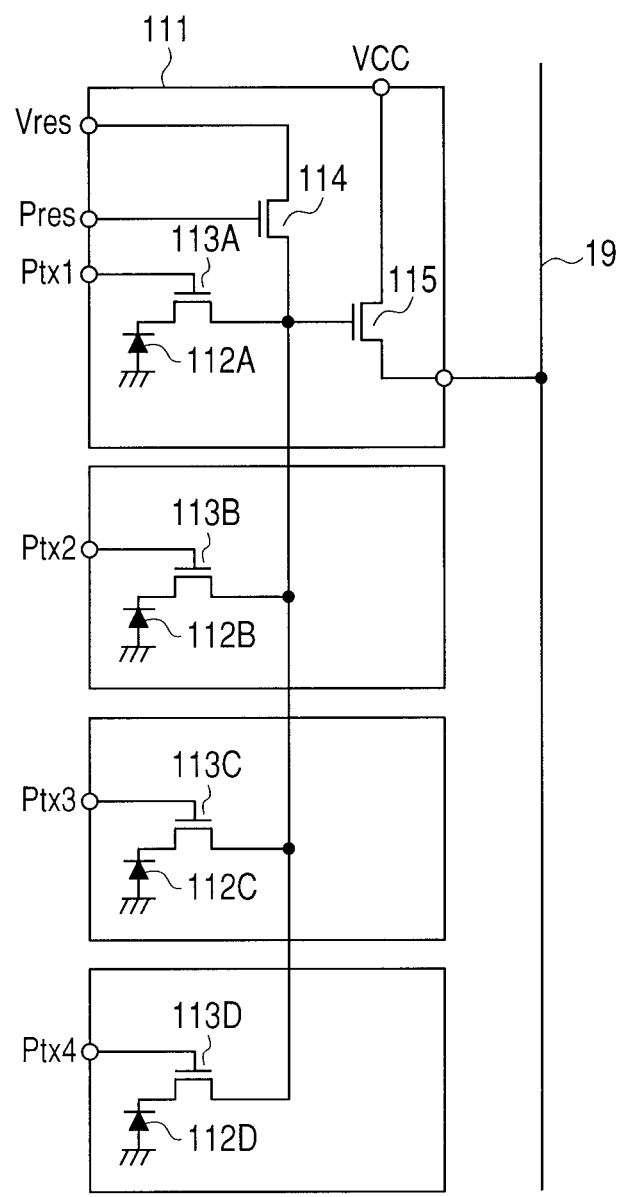
FIG. 22 is an equivalent circuit diagram of a pixel in the solid-state imaging apparatus to which the present invention is applicable.

For example, as illustrated in FIG. 22, one amplifier transistor 115 and one reset transistor 114 may be shared by multiple PDs 112 and multiple transfer transistors 113. When the pixel unit is configured in this way, the area taken up by the amplifier transistor and reset transistor in the pixel region can be reduced, making it easy to increase a light-receiving area of the PD 112.

Second Embodiment

A second embodiment of the present invention will be described with reference to drawings. Configuration of the solid-state imaging apparatus is the same as the first embodiment illustrated in FIG. 1. Configuration of the pixel 111 is different from that of the first embodiment and is illustrated in FIG. 7.

Figure 7:
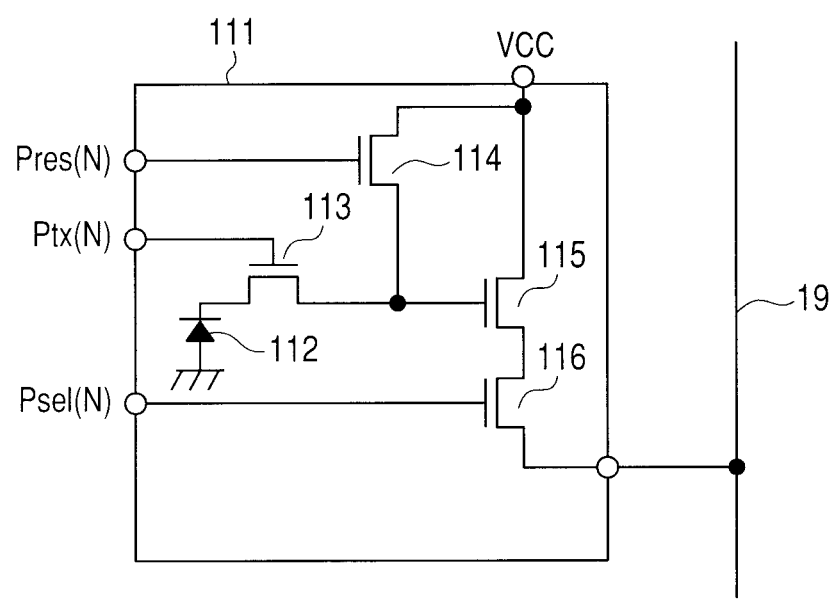
FIG. 7 is an equivalent circuit diagram of a pixel in the solid-state imaging apparatus to which the present invention is applicable.

FIG. 7 is an equivalent circuit diagram of the pixel according to the present embodiment. A difference from the first embodiment lies in that the source of the amplifier transistor 115 is connected to the vertical signal line 19 via a selection transistor 116. When the selection transistor 116 is turned on by a signal Psel(N) supplied from the vertical scanning unit 12, a constant current source (not illustrated) and the amplifier transistor 115 form a source follower circuit and a voltage level corresponding to the potential of the FD appears on the vertical signal line 19.

Figure 8:
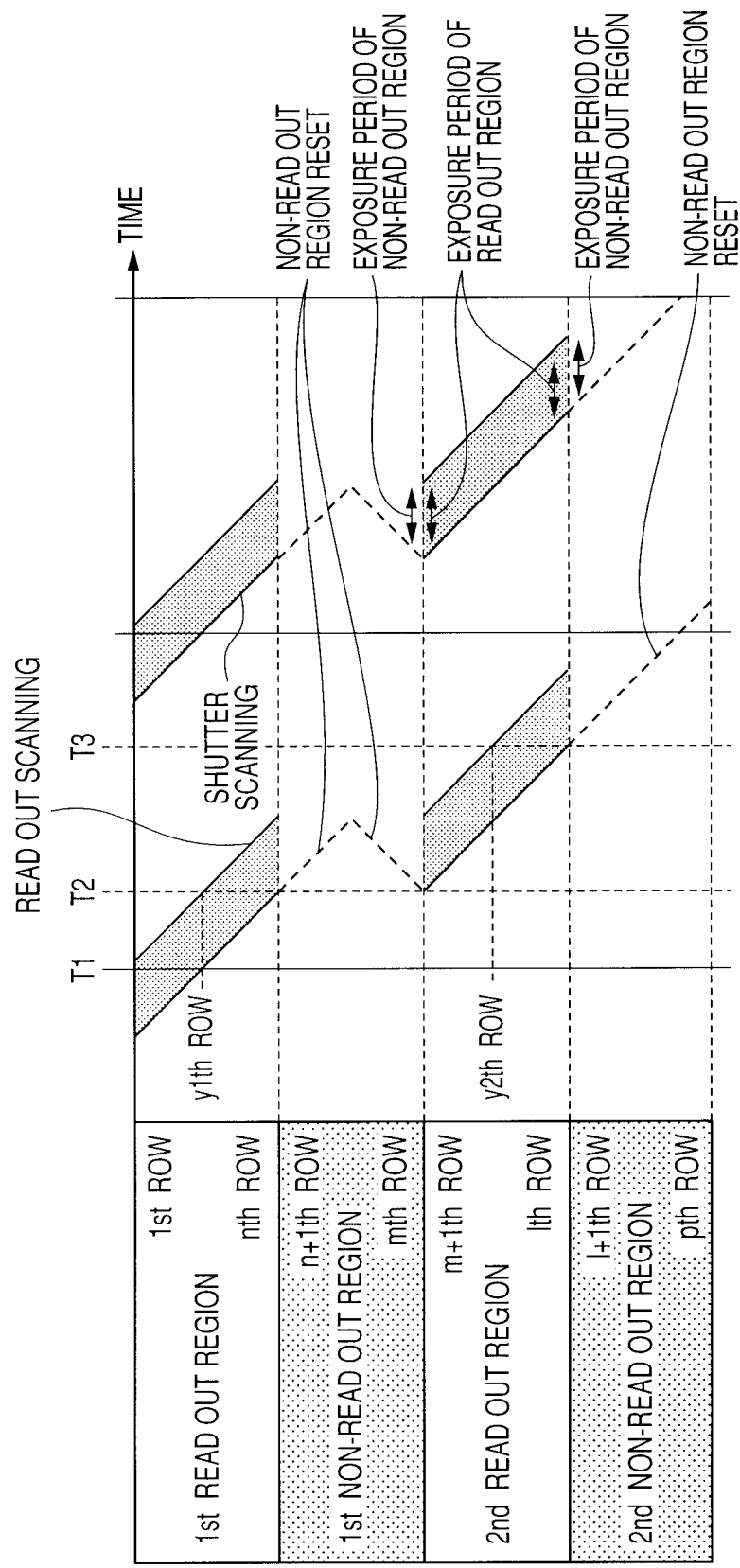
FIG. 8 is a conceptual operation diagram of a solid-state imaging apparatus according to second to fourth embodiments.

FIG. 8 is a diagram illustrating operation of the present embodiment. In FIG. 8, the ordinate represents position in the pixel unit 11 and the abscissa represents time. The present embodiment differs from the first embodiment in that by finishing at time T2, the shutter scanning of the first read out region extends into reset scanning of the first non-read out region. Also, the present embodiment differs from the first embodiment in that the reset scanning is started from the mth row and that shutter scanning of the second read out region is started from the m+1th row. Consequently, accumulation times of the pixels in the n+1th row, mth row, and m+1th row start simultaneously, and the difference in the accumulation time between the nth and n+1th rows becomes closer to the difference in the accumulation time between the mth and m+1th rows.

In FIG. 8, the reset scanning started from the mth row and reset scanning started from the m+1th row coincide in addresses or undergo reversal of magnitude relationship between the addresses, at some point. Thus, the two reset scanning operations of the first non-read out region can be stopped when the row addresses of the two reset scanning operations coincide with each other or the magnitude relationship between the row addresses is reversed.

Figure 9:
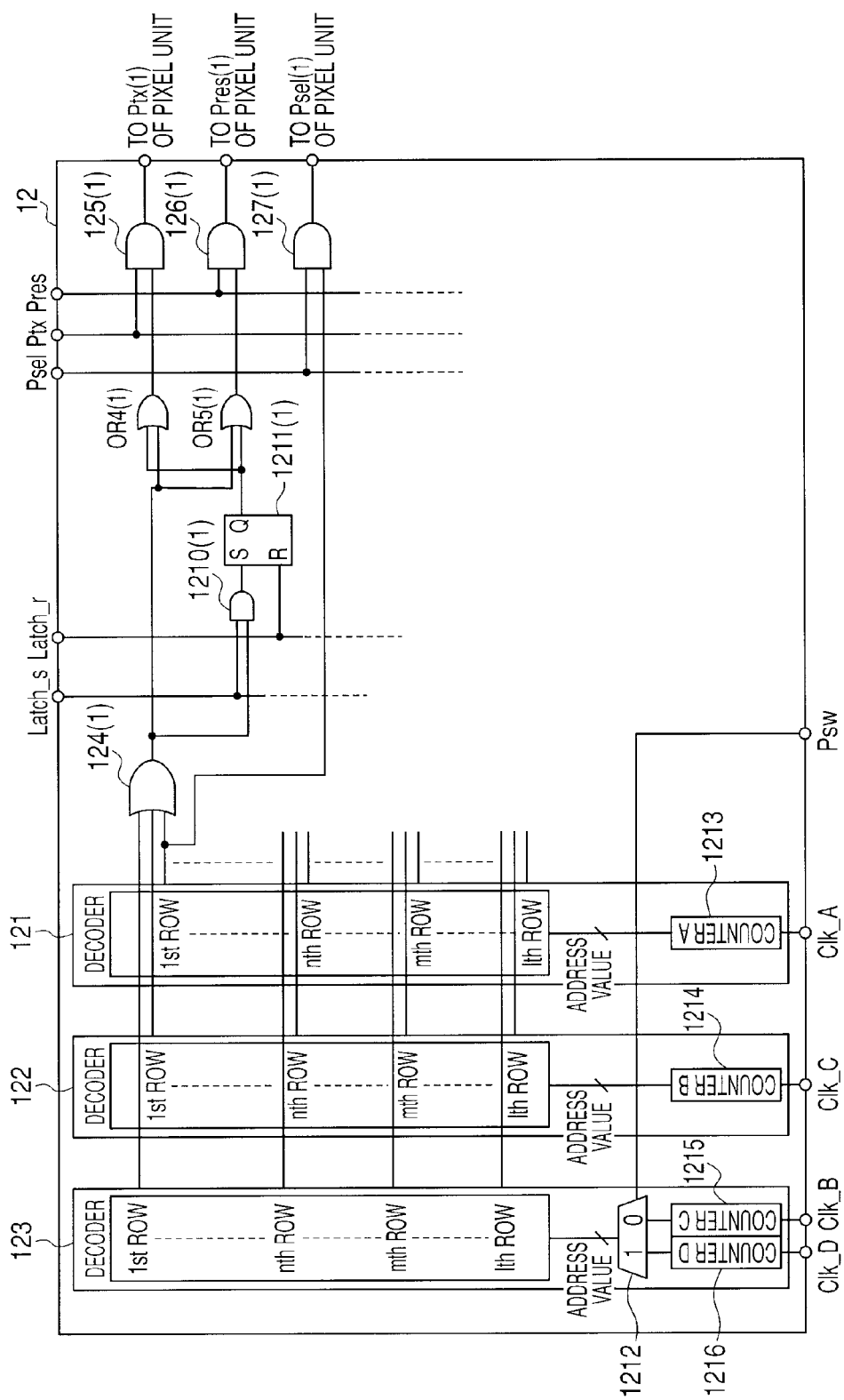
FIG. 9 is a diagram illustrating a configuration example of a vertical scanning unit according to the second embodiment.

FIG. 9 is a diagram illustrating a configuration example of the vertical scanning unit 12 according to the present embodiment. The read out row selecting unit 121 includes a decoder and counter A. The shutter row selecting unit 122 includes a decoder and counter B. A reset row selecting unit 123 includes a decoder, counters C and D and a selector 1212. Outputs of the counters C and D are connected to the selector 1212, and the output of a counter selected by the signal Psw is input in the decoder as an address value.

The vertical scanning unit 12 further includes an AND circuit 1210, an SR latch 1211, an OR circuit 124, and AND circuits 125, 126 and 127. The OR circuit 124(N) receives outputs of the read out row selecting unit 121, shutter row selecting unit 122 and reset row selecting unit 123, and outputs the logical sum of the received outputs. The output from the OR circuit 124(N) is input in the AND circuit 1210(N) and the logical product of the output and the signal Latch_s is given to the S terminal of the SR latch 1211. The signal Latch_r is given to an R terminal of the SR latch 1211. Outputs of the SR latch 1211 are given to an OR circuit OR4(N) and OR circuit OR5(N) and logically ORed thereby with the output of the OR circuit 124(N).

The AND circuit 125(N) receives the output of the OR circuit OR4 and the signal Ptx, and outputs the logical product thereof to the pixel unit as a signal Ptx(N). The AND circuit 126(N) receives the output of the OR circuit OR5(N) and the signal Pres, and outputs the logical product thereof to the pixel unit as a signal Pres(N). The AND circuit 127(N) receives an output of the read out row selecting unit 121 and a signal Psel, and outputs the logical product thereof to the pixel unit as a signal Psel(N).

Figure 10:
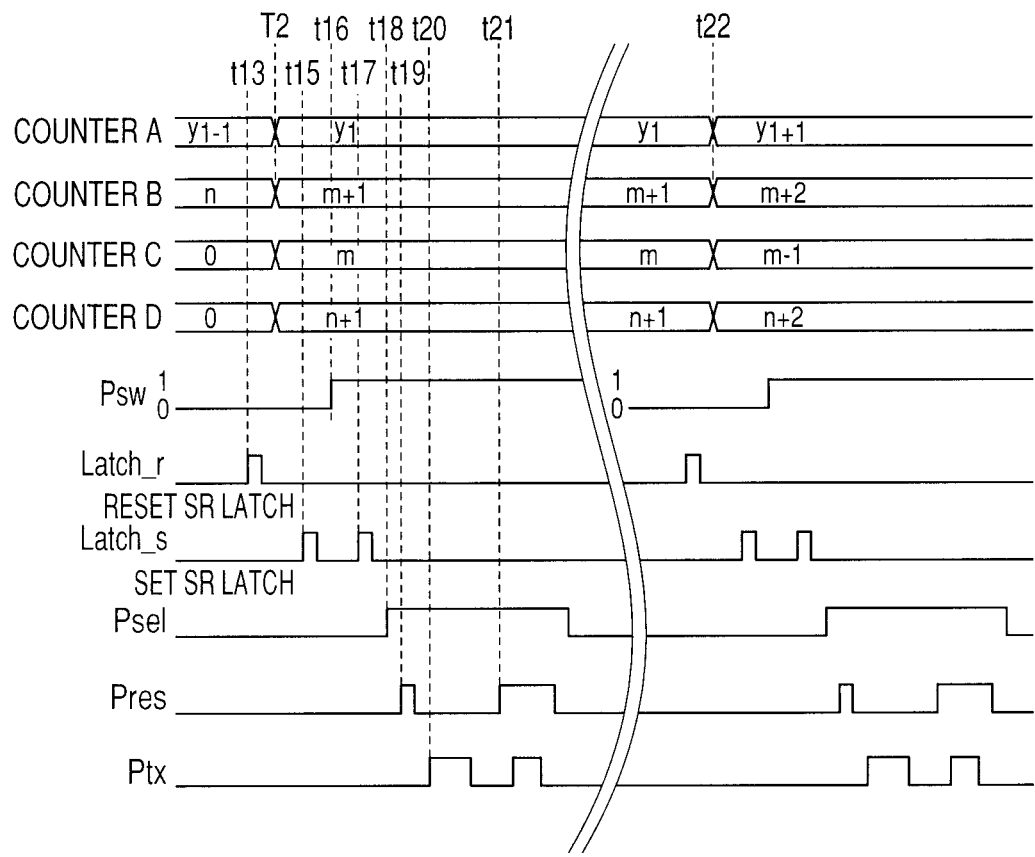
FIG. 10 is an operation timing chart of the solid-state imaging apparatus according to the second embodiment.

Next, operation of the present embodiment will be described with reference to FIG. 10. FIG. 10 illustrates timing of events taking place around time T2 in FIG. 8 and timing of events related to the next scan row. As can be seen from FIG. 8, read out scanning of the y1th row, reset scanning of the n+1th row and shutter scanning of the m+1th row are started at time T2.

First, at time t13 before time T2, the signal Latch_r becomes High and the SR latch 1211 is reset.

Next, at time T2, the counter A is incremented from y1−1 to y1, the counter B is changed from n to m+1, and the counters C and D are set to m and n+1, respectively. Since the signal Psw is 0, the count value of the counter C is supplied as an address value from the selector 1212 to the decoder 1217. At this point, outputs from the OR circuits 124(N) for the y1th, m+1th and mth rows become 1.

Next, at time t15, as the signal Latch_s becomes High, so does the output from the SR latch 1211(N).

As the signal Psw become 1 at time t16, the count value of the counter D is supplied as an address value from the selector 1212 to the decoder 1217. Consequently, the output from the OR circuit 124(N+1) for the n+1th row becomes High.

At time t17, as the signal Latch_s becomes High, so does the output from the SR latch 1211(N+1).

At time t18, as the signal Psel becomes High, so does an output Psel_y1 from an AND circuit 127_y1 for the y1th row. Consequently, the pixels in the y1th row are selected.

At time t19, as the signal Pres becomes High, so do outputs Pres(N) from the AND circuits 126(N) for the y1th, m+1th, mth and n+1th rows. Consequently, the FDs for the pixels in the y1th, m+1th, mth and n+1th rows are reset.

At time t20, as the signal Ptx becomes High, the transfer transistors of the pixels in the y1th, m+1th, mth and n+1th rows turn on, causing the electric charges accumulated in the PDs 112 to be transferred to the FDs.

Next, at time t21, as the signals Pres and Ptx become High, the reset transistors and transfer transistors of the pixels in the y1th, m+1th, mth and n+1th rows turn on, causing the electric charges accumulated in the PDs to be discharged to the power supply VCC.

At time t22, operations related to the next row are started, which are a repetition of the operations described above. The counter C, which is used for scanning from the mth row to the n+1th row, is decremented from m to m−1 at time t22. The other counters A, B and D are incremented.

Figure 11:
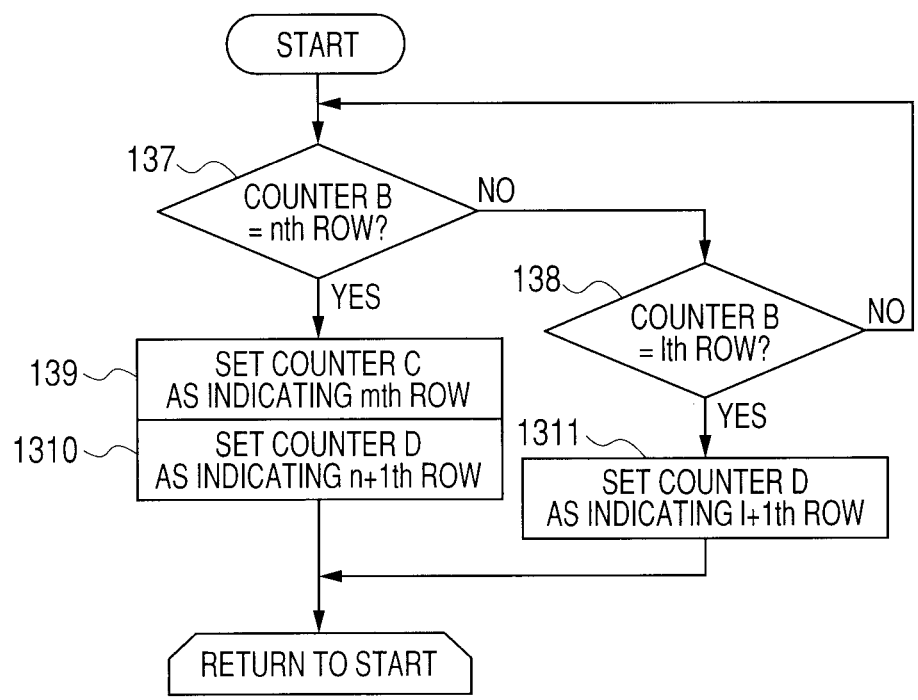
FIG. 11 is a diagram illustrating a process of a boundary discriminating unit according to the second embodiment.

A process of the boundary discriminating unit according to the present embodiment will be described with reference to the flowchart in FIG. 11. First, the boundary discriminating unit 13 determines whether the count value of the counter B used for shutter scanning of read out regions is n (137). If the count value of the counter B is n, the boundary discriminating unit 13 sets the count values of the counters C and D used for reset scanning of the first non-read out region to m and n+1, respectively (139 and 1310).

On the other hand, if the count value of the counter B is not n, the boundary discriminating unit 13 goes to Step 138. In Step 138, the boundary discriminating unit determines whether the count value of the counter B is 1. If the count value of the counter B is 1, the boundary discriminating unit goes to Step 1311 to set the count value of the counter D to l+1. If it is found in Step 138 that the count value of the counter B is not 1, the boundary discriminating unit returns to the first step.

According to the present embodiment, reset scanning of pixels in the n+1th and mth rows is started at time T2. That is, two reset scanning operations of a non-read out region adjacent to two read out regions are started simultaneously. Consequently, the difference in the accumulation time between the pixels in the nth and n+1th rows can be brought closer to the difference in the accumulation time between the pixels in the mth and m+1th rows. The present embodiment, which performs reset scanning of two rows in the non-read out region simultaneously, can bring the two accumulation time differences closer to each other than the first embodiment can.

Third Embodiment

Figure 12:
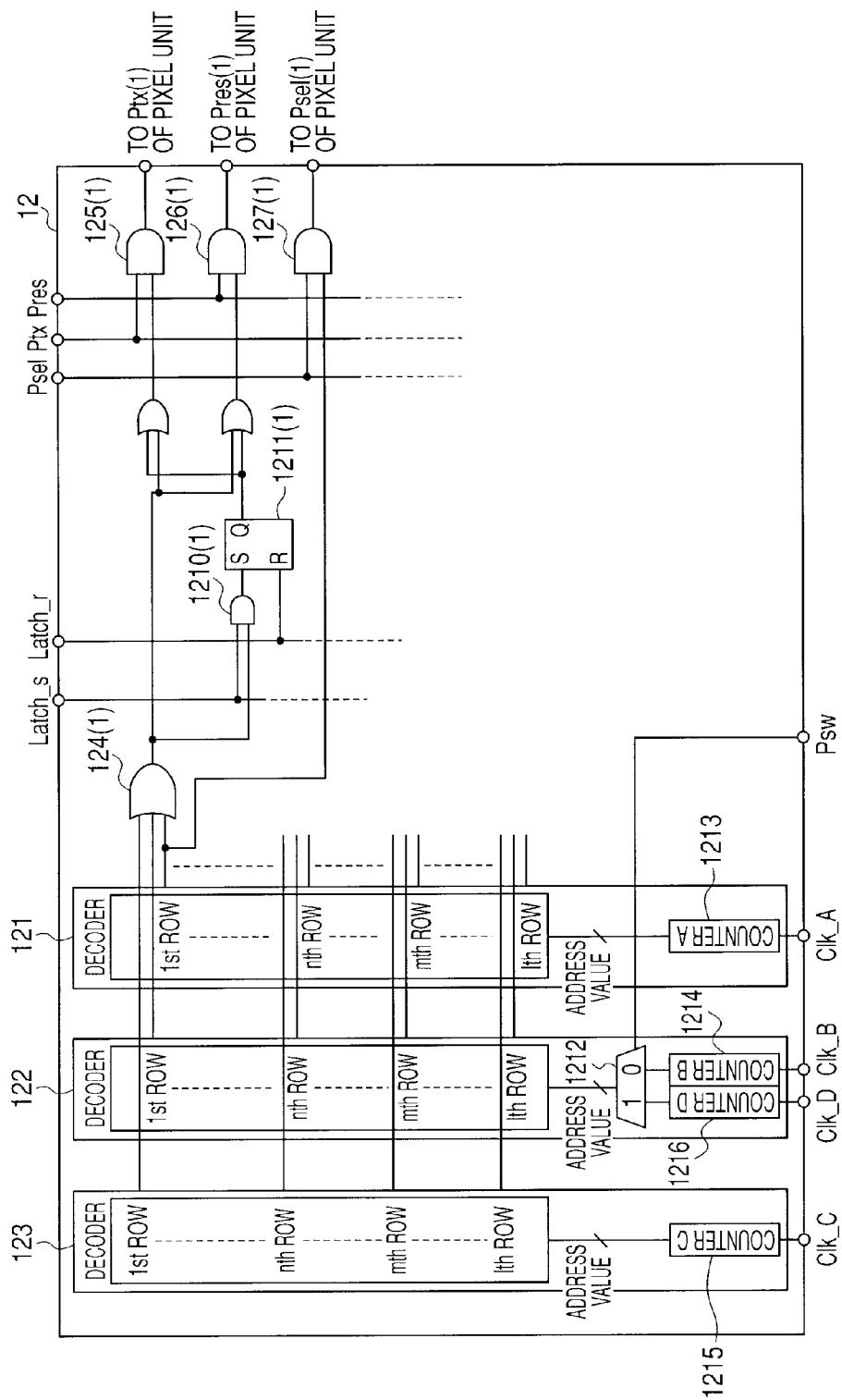
FIG. 12 is a diagram illustrating a configuration example of a vertical scanning unit according to the third embodiment.

Next, a third embodiment of the present invention will be described. Pixel configuration is the same as the second embodiment illustrated in FIG. 7. FIG. 12 is a diagram illustrating a configuration example of the vertical scanning unit 12 according to the present embodiment. This configuration differs from the configuration illustrated in FIG. 9 in that the shutter row selecting unit 122 has counters B and D. In the conceptual operation diagram illustrated in FIG. 8, the counter B is used for shutter scanning of the first read out region and reset scanning of part of the first non-read out region. On the other hand, the counter D is used for shutter scanning of the second read out region and reset scanning of the second non-read out region in the conceptual operation diagram of FIG. 8.

Figure 13:
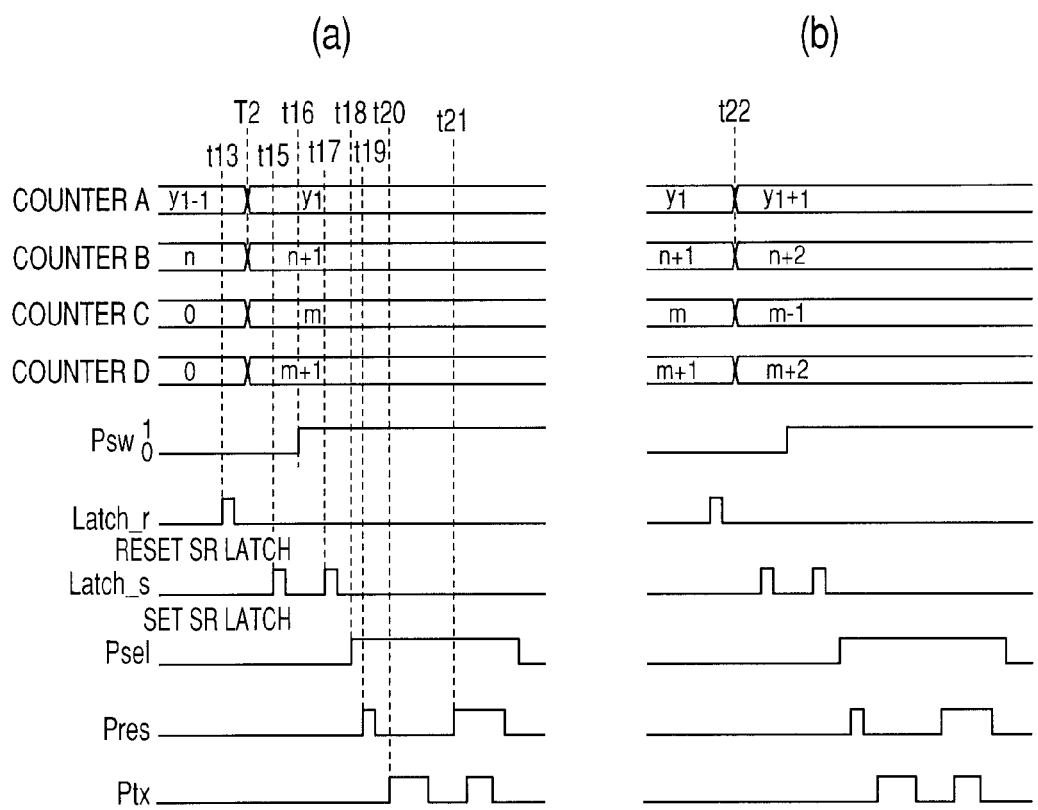
FIG. 13 shows an operation timing chart of the solid-state imaging apparatus according to the third embodiment.

FIG. 13 shows, in (a) and (b), operation timing charts for illustrating operation of the present embodiment. FIG. 13 illustrates, in (a), operations started at time T 2 in FIG. 8. And, FIG. 13 illustrates, in (b), operations related to the next row.

At time T2 in FIG. 13, the counter A is incremented from y1−1 to y1, the counter B is incremented from n to n+1, and the counters C and D are set to m and m+1, respectively. Since the signal Psw is 0, the count value of the counter B is supplied as an address value from the selector 1212 to the decoder. At this point, outputs from the OR circuits 124(N) for the y1th, n+1th and mth rows become 1.

Next, as the signal Latch_s becomes High at time t15, so do outputs from the SR latches 1211(N) for the y1th, n+1th and mth rows.

As the signal Psw becomes 1 at time t16, the count value of the counter D is supplied as an address value from the selector 1212 to the decoder. Consequently, the output from an OR circuit 124_m+1 for the m+1th row becomes High.

At time t17, as the signal Latch_s becomes High, so does the output from the SR latch 1211_*m*+1.

At time t18, as the signal Psel becomes High, so does the output Psel_y1 from the AND circuit 127_y1 for the y1th row. Consequently, the pixels in the y1th row are selected.

At time t19, as the signal Pres becomes High, so do outputs Pres_N from the AND circuits 126_N for the y1th, n+1th, mth and m+1th rows. Consequently, the FDs of the pixels in the y1th, n+1th, mth and m+1th rows are reset.

At time t20, as the signal Ptx becomes High, the transfer transistors of the pixels in the y1th, n+1th, mth and m+1th rows turn on, causing the electric charges accumulated in the PDs 112 to be transferred to the FDs.

Next, at time t21, as the signals Pres and Ptx become High, the reset transistors and transfer transistors of the pixels in the y1th, n+1th, mth and m+1th rows turn on, causing the electric charges accumulated in the PDs 112 to be discharged to the power supply VCC.

At time t22, operations related to the next row are started, which are a repetition of the operations described above. The counter C, which is used for scanning from the mth row to the n+1th row, is decremented from m to m−1 at time t22. The other counters A, B and D are incremented.

Figure 14:
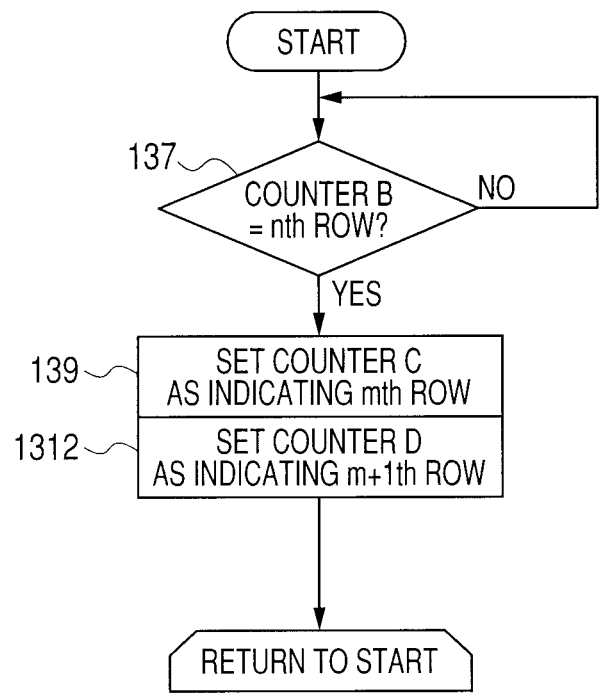
FIG. 14 is a diagram illustrating a process of a boundary discriminating unit according to the third embodiment.

A process of the boundary discriminating unit according to the present embodiment will be described with reference to the flowchart in FIG. 14. First, the boundary discriminating unit 13 determines whether the count value of the counter B used for the shutter scanning of read out regions is n (137). If the count value of the counter B is n, the boundary discriminating unit 13 sets the counter C used for reset scanning of the first non-read out region to m (139). Also, the boundary discriminating unit 13 sets the counter D used for shutter scanning of the second read out region to m+1 (1312).

On the other hand, if the count value of the counter B is not n, the boundary discriminating unit 13 returns to the first step, and goes to Step 137 when the counter value changes.

The present embodiment described above provides advantages similar to those of the second embodiment.

Fourth Embodiment

Next, a fourth embodiment of the present invention will be described.

Figure 15:
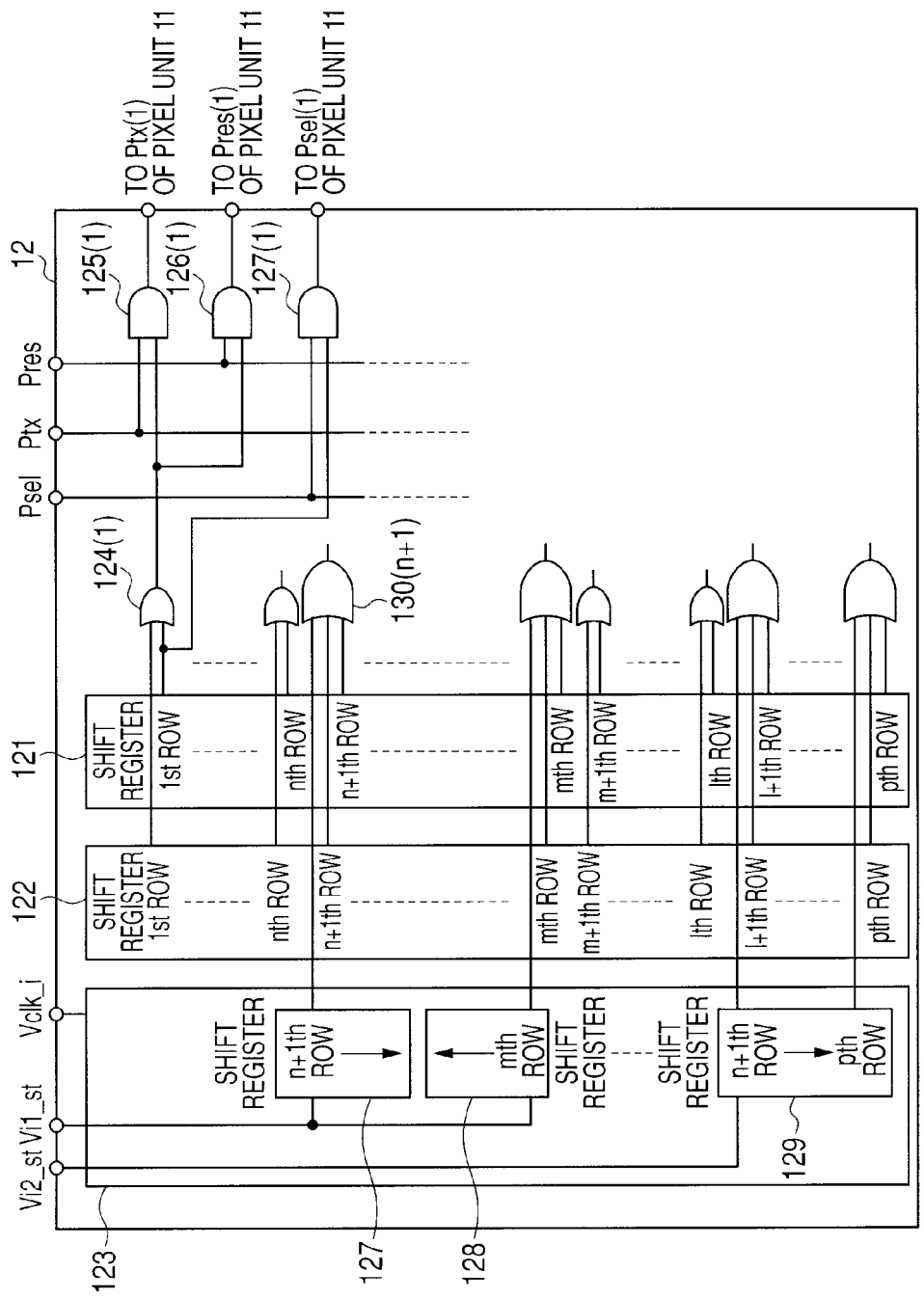
FIG. 15 is a diagram illustrating a configuration example of a vertical scanning unit according to the fourth embodiment.

FIG. 15 is a diagram illustrating a configuration example of the vertical scanning unit 12 according to the present embodiment. The present embodiment differs from the first to third embodiments in that the read out row selecting unit 121, shutter row selecting unit 122 and reset row selecting unit 123 include a shift register instead of a decoder.

The shift register included in the read out row selecting unit 121 increments an address in sequence from the first row to the pth row in response to shift pulses (not illustrated). The shift register included in the shutter row selecting unit 122 increments an address in sequence from the first row to the pth row in response to shift pulses (not illustrated). Also, the reset row selecting unit 123 includes a shift register block 127 which performs forward scanning of the first non-read out region, shift register block 129 which performs forward scanning of the second non-read out region, and shift register block 128 which performs reverse scanning.

A signal Vi1_st is given to the shift register blocks 127 and 128 to start scanning. Also, a signal Vi2_st is given to the shift register block 129 to start scanning.

The vertical scanning unit 12 according to the present embodiment uses the OR circuit 124(N) which outputs the logical sum of the outputs of the read out row selecting unit 121 and shutter row selecting unit 122 for the rows from the first row to the nth row and the rows from m+1th row to the first row, i.e., for the first and second read out regions. On the other hand, for the rows from the n+1th row to the mth row and the rows from the l+1th row to the pth row, i.e., for the first and second non-read out regions, the vertical scanning unit 12 uses the OR circuit 130(N) which outputs the logical sum of the outputs of the read out row selecting unit 121, shutter row selecting unit 122 and reset row selecting unit 123.

The AND circuit 125(N) supplies the logical product of the output of the OR circuit 124(N) and the signal Ptx to the pixel unit as a signal Ptx (N). Also, the AND circuit 126(N) supplies the logical product of the output of the OR circuit 124(N) and the signal Pres to the pixel unit as a signal Pres(N). Also, the AND circuit 127(N) supplies the logical product of the output of the read out row selecting unit 121 and the signal Psel to the pixel unit as a signal Psel(N).

In the first and second non-read out regions, OR circuits 130_N are provided instead of the OR circuits 124(N). The OR circuit 130_N differs from the OR circuit 124(N) in that the OR circuit 130_N is supplied with an output from the reset row selecting unit 123 in addition to the outputs from the read out row selecting unit 121 and shutter row selecting unit 122. The OR circuit 130(N) is configured to output the logical sum of the outputs of the row selecting units 121, 122 and 123. Otherwise, the OR circuit 130(N) is configured the same as the OR circuit 124(N).

Figure 16:
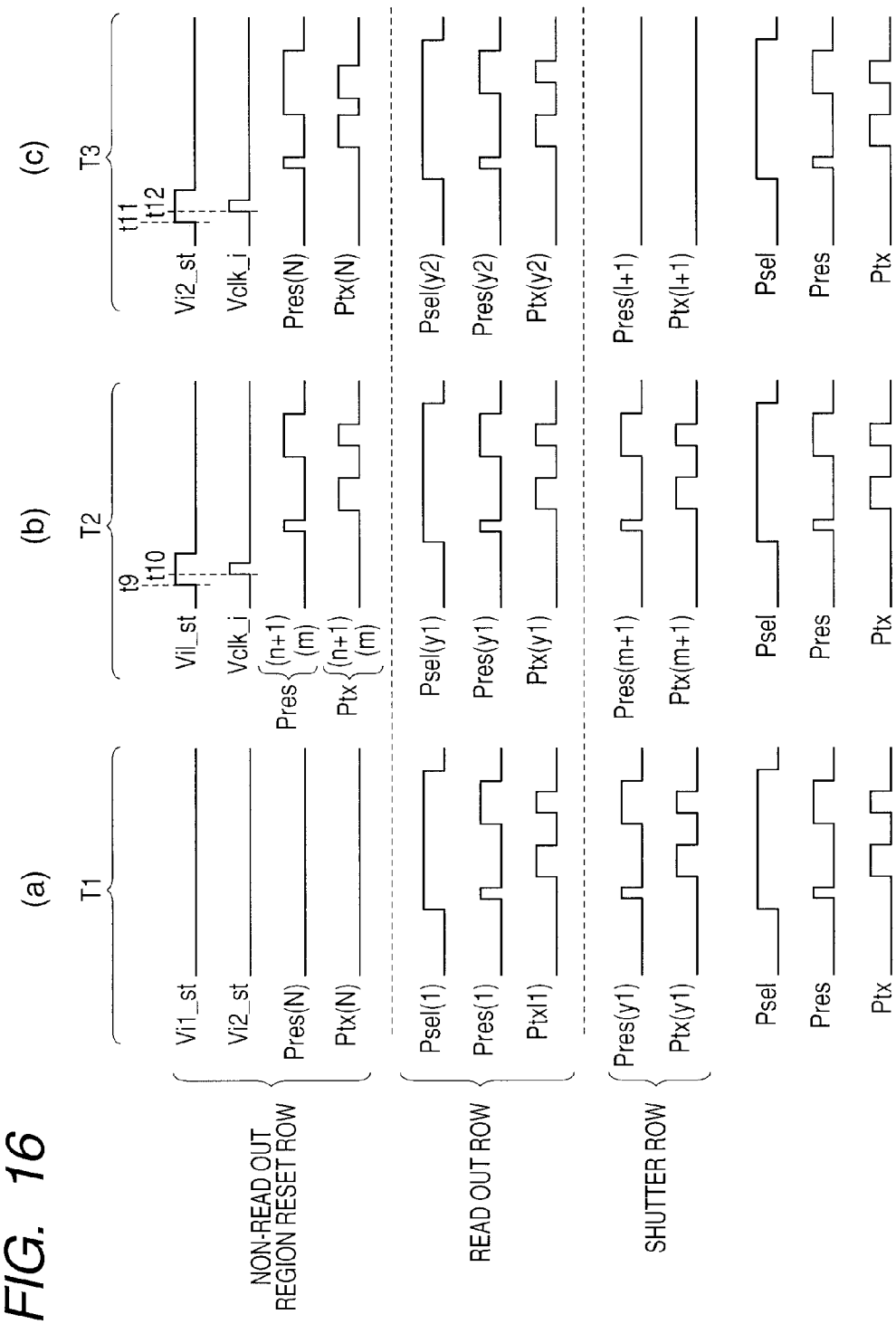
FIG. 16 shows an operation timing chart of the solid-state imaging apparatus according to the fourth embodiment.

FIG. 16 shows in (a), (b) and (c) diagrams for illustrating operation of the present embodiment. FIG. 16 illustrates in (a), (b) and (c) operations started at times T1, T2 and T3 in FIG. 8, respectively.

Looking at operations started at time T1, a read out operation of the pixels in the first row and shutter scanning of the pixels in the y1th row are performed. Regarding the rows designated as "read out rows" in (a) in FIG. 16, when the signal Psel becomes High, a signal Psel(1) is supplied to the pixel unit via the AND circuit 127(1), causing the pixels in the first row to be selected. Subsequently, when the signal Pres becomes High, a signal Pres(1) is supplied to the pixel unit via an AND circuit 126(1) to reset the FDs of the pixels in the first row. Then, as the signal Ptx becomes High, a signal Ptx(1) is supplied to the pixel unit via an AND circuit 125(1), causing the electric charges accumulated in the PDs to be transferred to the FDs. Subsequently, when the signals Pres and Ptx become High, since the signals Pres(1) and Ptx(1) become High, the electric charges accumulated in the PDs of the pixels in the first row are discharged to the power supply.

Next, looking at the rows designated as a "shutter rows" in (a) in FIG. 16, when the signals Pres and Ptx become High, signals Pres(y1) and Ptx(y1) are supplied to the pixel unit, causing the electric charges accumulated in the PDs of the pixels in the first row to be discharged to the power supply.

Looking at "non-read out region reset rows" in (a) in FIG. 16, signals Vi1_st, Vi2_st and Vclk_i are all Low in the given period. Thus, in this period, in spite of changes in the signals Pres and Ptx, the signals Pres(N) and Ptx(N) for the non-read out region remain Low.

Operations started at time T2 will be described with reference to (b) in FIG. 16. At time T2, read out scanning of the y1th row, reset scanning of the n+1th and mth rows and shutter scanning of the m+1th row are started. Operations with respect to "read out rows" and "shutter rows" are the same as the operations described with reference to (a) in FIG. 16 except that different rows are scanned, and thus description thereof will be omitted.

Looking at the "non-read out region reset rows," since the signal Vi1_st becomes High at time t9 and the signal Vclk_i becomes High at time t10, outputs from OR circuits 130(*n*+1)

and 130(*m*) become High. In this state, when both the signals Pres and Ptx become High, signals Pres(n+1), Pres(m), Ptx (n+1) and Ptx(m) are output, causing the electric charges accumulated in the PDs of the pixels in the n+1th and mth rows to be discharged to the power supply.

Operations started at time T3, will be described with reference to (c) in FIG. 16. At time T3, read out scanning of the y2th row and reset scanning of the l+1th row are started. Operations with respect to the "non-read out region reset rows" and "read out rows" are the same as the operations described with reference to (b) in FIG. 16 except that different rows are handled, and thus description thereof will be omitted.

Figure 17:
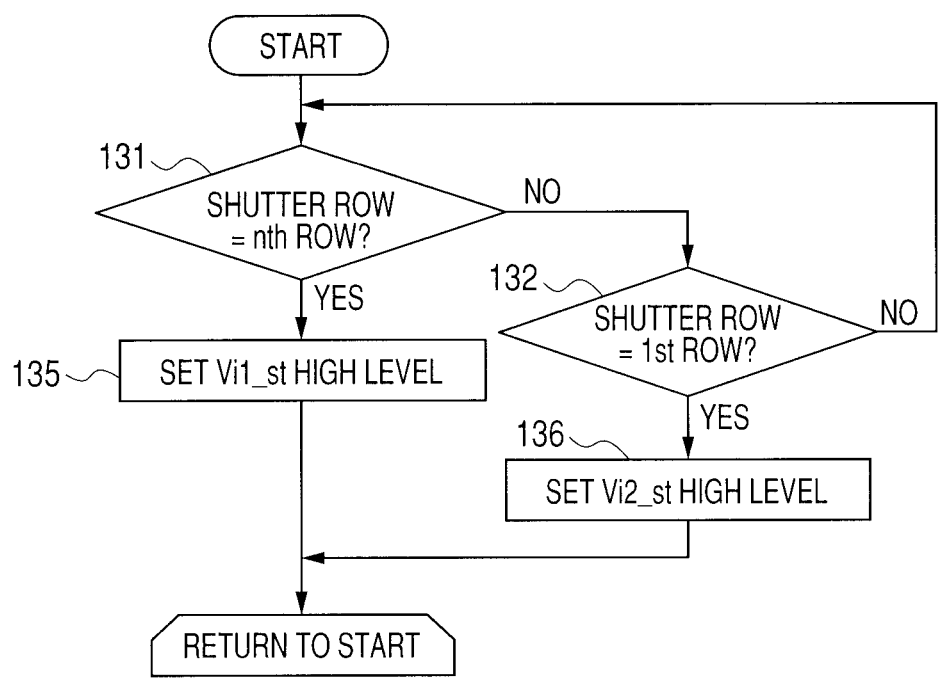
FIG. 17 is a diagram illustrating a process of a boundary discriminating unit according to the fourth embodiment.

Next, a process of the boundary discriminating unit 13 according to the present embodiment will be described with reference to FIG. 17.

First, the boundary discriminating unit 13 determines whether the row selected by the shutter row selecting unit 122 is the nth row (131). If the row selected by the shutter row selecting unit 122 is the nth row, the boundary discriminating unit 13 sets the signal Vi1_*st* to High (135). Consequently, reset scanning of the first non-read out region is started from the n+1th and mth rows.

On the other hand, if the row selected by the shutter row selecting unit 122 is not the nth row, the boundary discriminating unit 13 determines whether the row selected by the shutter row selecting unit 122 is the lth row (132). If the row is the lth row, the boundary discriminating unit 13 sets the signal Vi2_*st* to High (136). Consequently, reset scanning of the second non-read out region is started from the l+1th row.

If it is found in Step 132 that the row is not the lth row, the boundary discriminating unit 13 increments the address for the shutter row selecting unit 122 and performs the process of Step 131 again.

The present embodiment described above provides advantages similar to those of the third embodiment. The present embodiment, which uses shift registers rather than counters or decoders for the vertical scanning unit 12, has the advantage of being able to realize a more simplified configuration than the third embodiment.

Fifth Embodiment

Next, a fifth embodiment of the present invention will be described.

Figure 18:
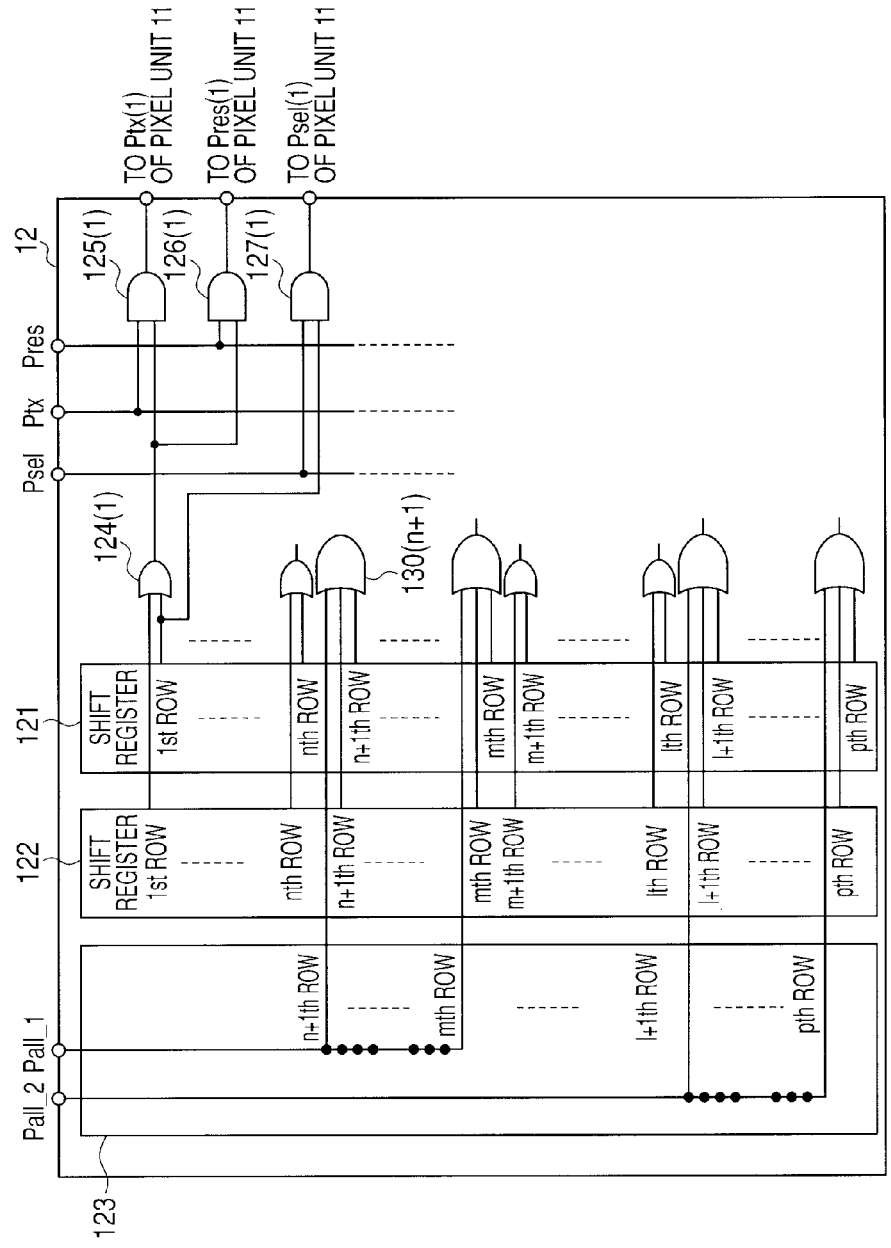
FIG. 18 is a diagram illustrating a configuration example of a vertical scanning unit according to a fifth embodiment.

FIG. 18 is a diagram illustrating a configuration example of the vertical scanning unit 12 according to the present embodiment. According to the present embodiment, the non-read out row selecting unit 123 can select the n+1th to mth rows simultaneously as well as select the l+1th to pth rows simultaneously. The read out row selecting unit 121 and shutter row selecting unit 122 are the same as those illustrated in FIG. 15, and thus description thereof will be omitted.

Figure 19:
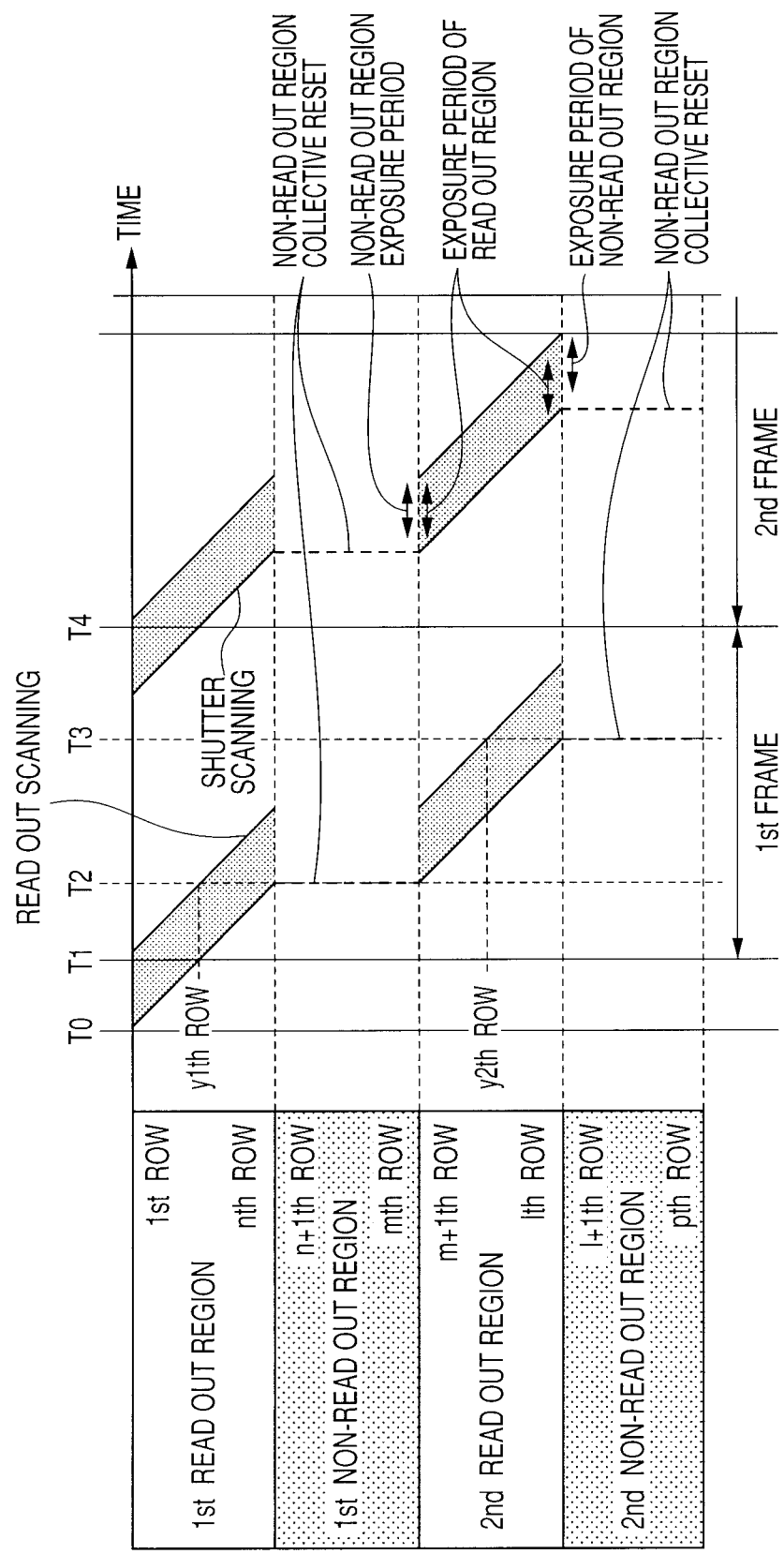
FIG. 19 is a conceptual operation diagram of a solid-state imaging apparatus according to the fifth embodiment.

FIG. 19 is a conceptual diagram of operation according to the present embodiment, where the ordinate represents position in the pixel unit 11 and the abscissa represents time. As can be seen from FIG. 19, reset scanning of the first non-read out region is started all at once at time T2. Consequently, the difference in the accumulation time between the nth and n+1th rows can be brought closer to the difference in the accumulation time between the mth and m+1th rows.

Figure 20:
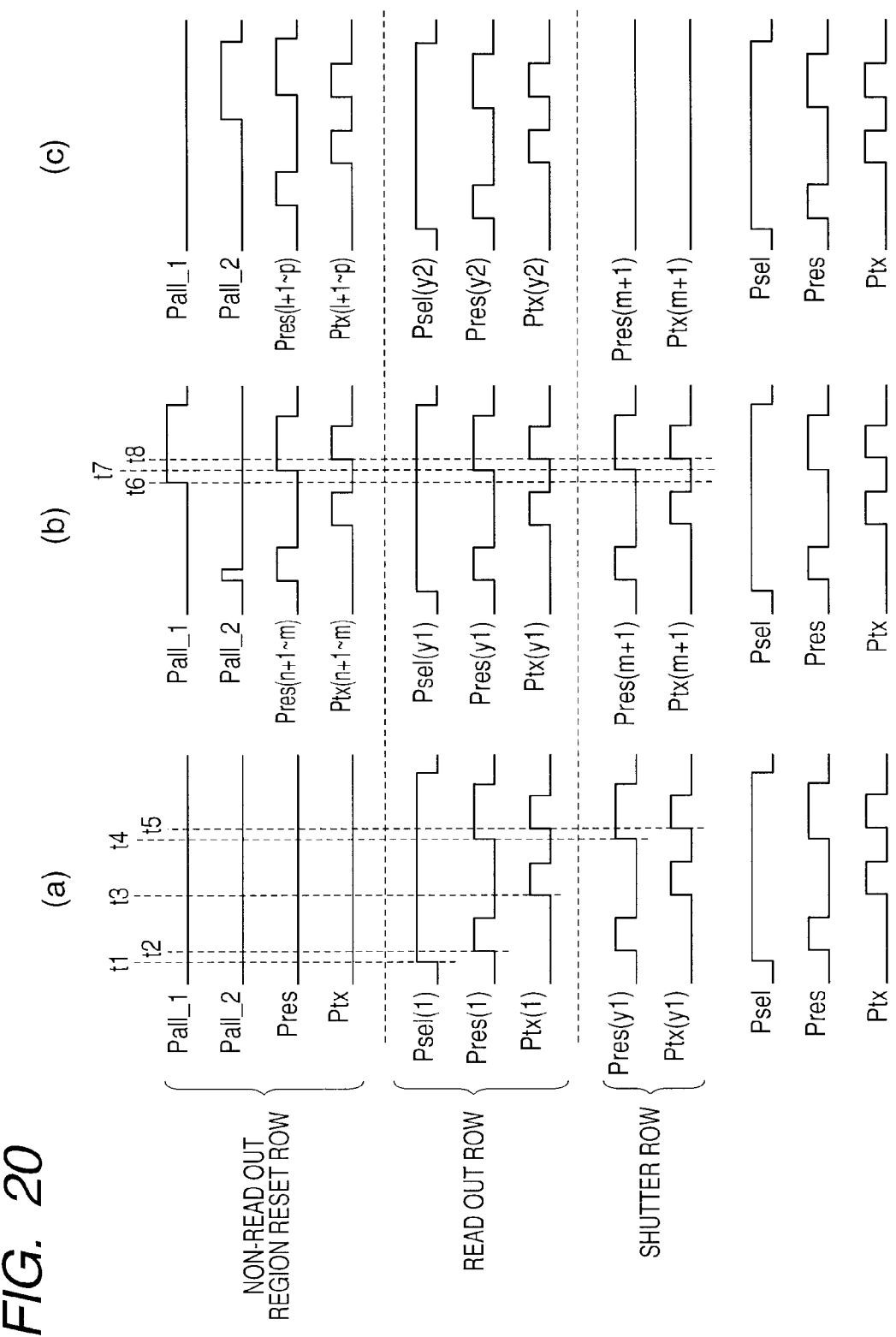
FIG. 20 shows an operation timing chart of the solid-state imaging apparatus according to the fifth embodiment.

FIG. 20 shows in (a), (b) and (c) diagrams for illustrating operation of the present embodiment. FIG. 20 illustrates in (a), (b) and (c) operations started at times T1, T2 and T3 in FIG. 19, respectively.

Looking at operations started at time T1, a read out operation of the pixels in the first row and shutter scanning of the y1th row are performed. Looking at "read out rows" in (a) in FIG. 20, when the signal Psel becomes High, a signal Psel (1) is supplied to the pixel unit via the AND circuit 127(1), causing the pixels in the first row to be selected. Subsequently, when the signal Pres becomes High, a signal Pres(1) is supplied to the pixel unit via an AND circuit 126(1) to reset the FDs of the pixels in the first row. Then, as the signal Ptx becomes High, a signal Ptx(1) is supplied to the pixel unit via an AND circuit 125(1), causing the electric charges accumulated in the PDs to be transferred to the FDs. Subsequently, when the signals Pres and Ptx become High, since the signals Pres(1) and Ptx(1) become High, the electric charges accumulated in the PDs of the pixels in the first row are discharged to the power supply.

Next, looking at the rows designated as "shutter rows" in (a) in FIG. 20, when the signals Pres and Ptx become High, signals Pres(y1) and Ptx(y1) are supplied to the pixel unit, causing the electric charges accumulated in the PDs of the pixels in the first row to be discharged to the power supply.

On the other hand, looking at "non-read out region reset rows" in (a) in FIG. 20, signals Pall_1 and Pall_2 are both Low in the given period. Thus, in this period, in spite of changes in the signals Pres and Ptx, the signals Pres(N) and Ptx(N) for the non-read out region remain Low.

Operations started at time T2 will be described with reference to (b) in FIG. 20. At time T2, read out scanning of the y1th row, reset scanning of the n+1th to mth rows and shutter scanning of the m+1th row are started. Operations with respect to the "read out rows" and "shutter rows" are the same as the operations described with reference to (a) in FIG. 20 except that different rows are scanned, and thus description thereof will be omitted.

Looking at the "non-read out region reset rows," since the signal Pall_1 becomes High at time t6, outputs from OR circuits 124(*n*+1) to 124(*m*) become High. When the signal Pres becomes High at time t7, signals Pres(n+1) to Pres(m) are output from AND circuits 126(*n*+1) to 126(*m*). Furthermore, when the signal Ptx becomes High at time t8, signals Ptx (n+1) to Ptx(m) are output from AND circuits 125(*n*+1) to 125(*m*).

Operations started at time T3 will be described with reference to (c) in FIG. 20. At time T3, read out scanning of the y2th row and reset scanning of the l+1th to pth rows are started. Operations with respect to the "read out rows" are the same as the operations described with reference to (b) in FIG. 20 except that different rows are handled, and thus description thereof will be omitted.

Looking at the "shutter rows," since there is no pixel rows to be scanned at time T3, the signals Pres(N) and Ptx(N) remain Low.

Looking at the "non-read out region reset rows," the signal Pall_2 becomes High. Consequently, outputs from OR circuits 130(*l*+1) to 130(*p*) for the l+1th to pth rows become High. Subsequently, when the signal Pres becomes High, signals Pres(l+1) to Pres(p) are output via AND circuits 126 (*l*+1) to 126(*p*). Consequently, the reset transistors of the pixels in the l+1th to pth rows turn on, resetting the potential of the FDs.

Furthermore, when the signal Ptx becomes High, signals Ptx (l+1) to Ptx(p) are output via AND circuits 125(*l*+1) to 125(*p*). Consequently, the transfer transistors of the pixels in the l+1th to pth rows turn on, causing the electric charges accumulated in the PDs to be discharged to the power supply.

Figure 21:
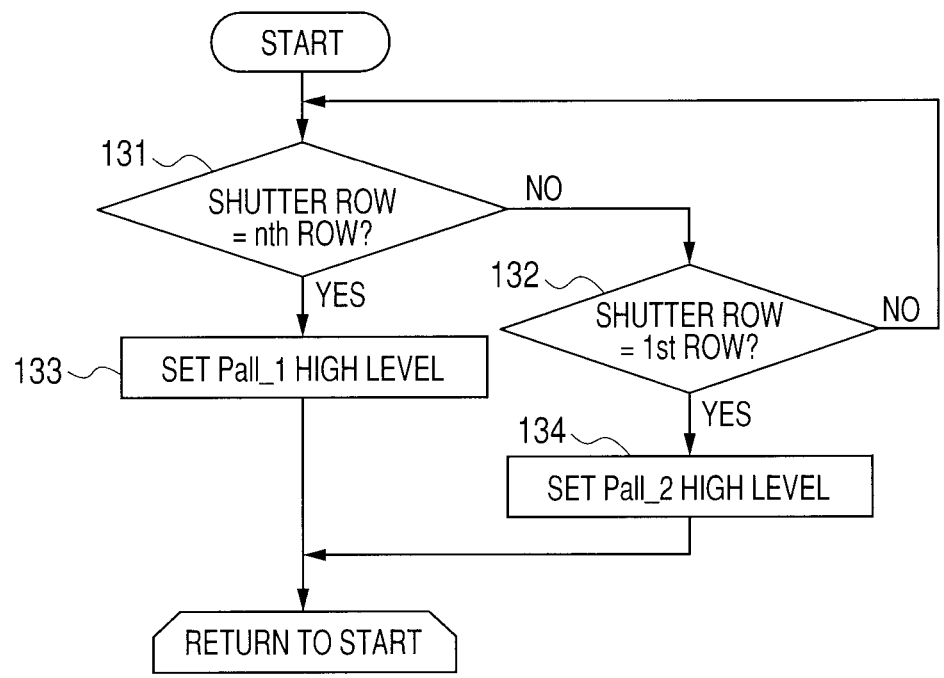
FIG. 21 is a diagram illustrating a process of a boundary discriminating unit according to the fifth embodiment.

Next, a process of the boundary discriminating unit 13 according to the present embodiment will be described with reference to FIG. 21.

First, the boundary discriminating unit 13 determines whether the row selected by the shutter row selecting unit 122 is the nth row (131). If the row selected by the shutter row selecting unit 122 is the nth row, the boundary discriminating unit 13 sets the signal Pall_1 to High (133). Consequently, reset scanning of the entire first non-read out region is started.

On the other hand, if the row selected by the shutter row selecting unit 122 is not the nth row, the boundary discriminating unit 13 determines whether the row selected by the shutter row selecting unit 122 is the lth row (132). If the row is the lth row, the boundary discriminating unit 13 sets the signal Pall_2 to High (134). Consequently, reset scanning of the second non-read out region is started from the l+1th row.

If it is found in Step 132 that the row is not the lth row, the boundary discriminating unit 13 increments the address for the shutter row selecting unit 122 and performs the process of Step 131 again.

The present embodiment described above provides advantages similar to those of the third and fourth embodiments. The present embodiment, which can implement the reset row selecting unit 123 using a simple configuration, has the advantage of being able to realize a still more simplified configuration than the fourth embodiment.

Sixth Embodiment

Figure 23:
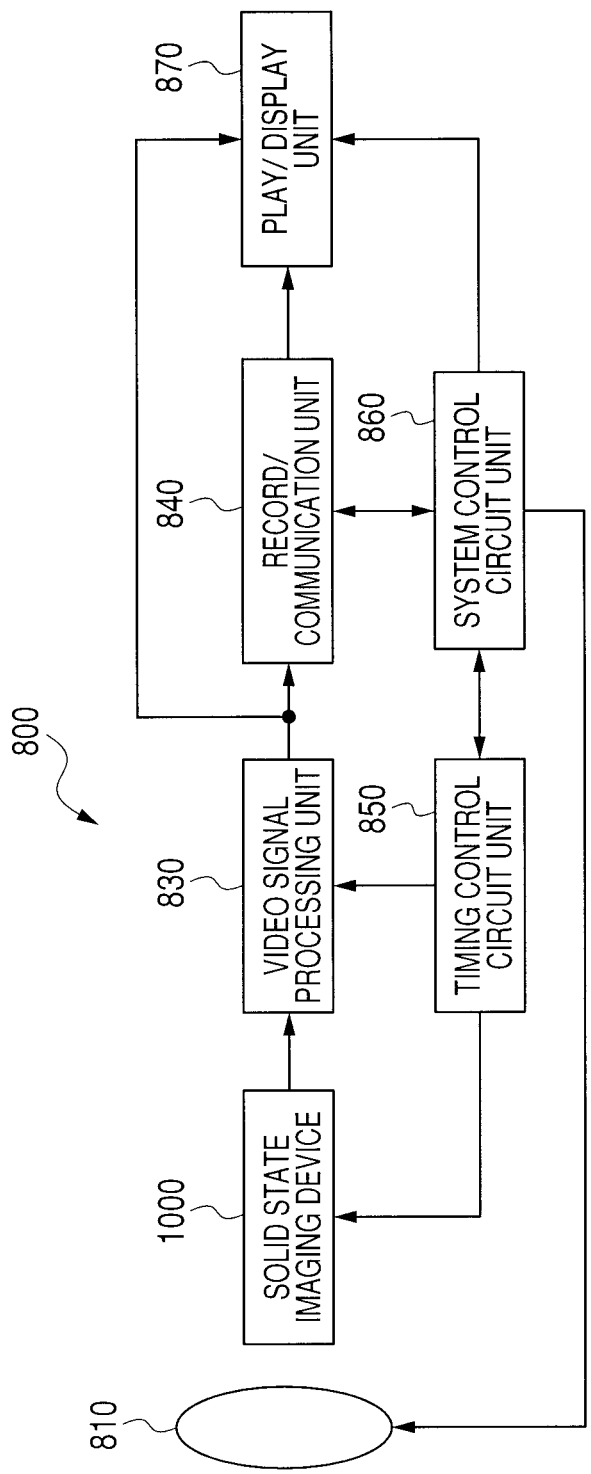
FIG. 23 is a diagram illustrating a configuration example of an imaging system to which the present invention is applicable.

Next, an outline of an imaging system according to the present embodiment will be described with reference to FIG. 23.

An imaging system 800 includes, for example, an optical unit 810, solid-state imaging apparatus 1000, video signal processing circuit unit 830, record/communication unit 840, timing control circuit unit 850, system control circuit unit 860 and play/display unit 870.

The optical unit 810 which includes lenses and other optical series focuses light from a subject and thereby forms an image of the subject on a pixel unit of the solid-state imaging apparatus 1000, where multiple pixels are arranged two-dimensionally in the pixel unit. The pixel unit includes an effective pixel region. In synchronism with a signal from the timing control circuit unit 850, the solid-state imaging apparatus 1000 outputs a signal corresponding to the light focused on the pixel unit.

The signal output from the solid-state imaging apparatus 1000 is input in the video signal processing circuit unit 830 which is a video signal processing unit. The video signal processing circuit unit 830 performs AD conversion and other processes on the input electrical signal according to a method prescribed by a program or the like. The signal obtained as a result of processing by the video signal processing circuit unit is sent to the record/communication unit 840 as an image data. The record/communication unit 840 sends signals needed to form an image to the play/display unit 870, which then displays moving images or still images accordingly. Also, in response to a signal from the video signal processing circuit unit 830, the record/communication unit 840 communicates with the system control circuit unit 860 as well as record signals used to form images, on a recording medium (not illustrated).

The system control circuit unit 860, which centrally controls operation of the imaging system, controls driving of the optical unit 810, timing control circuit unit 850, record/communication unit 840 and play/display unit 870. Also, the system control circuit unit 860 is equipped with a storage medium (not illustrated) such as a recording medium to record programs and the like needed to control the operation of the imaging system. Also, the system control circuit unit 860 supplies a signal within the imaging system to switch a driving mode, for example, in response to a user action. Concrete examples include changing the angle of view as a result of electronic zooming and shifting the angle of view as a result of electronic vibration isolation.

The timing control circuit unit 850 controls drive timing of the solid-state imaging apparatus 1000 and video signal processing circuit unit 830 under control of the system control circuit unit 860 which functions as control means.

(Others)

It has been stated that according to the present invention, reset scanning of the first non-read out region is started before read out scanning of the second read out region adjacent to the first non-read out region. Furthermore, it has been stated that reset scanning of the pixels in the n+1th row is performed before read out scanning of the pixels in the nth row.

Figure 24:
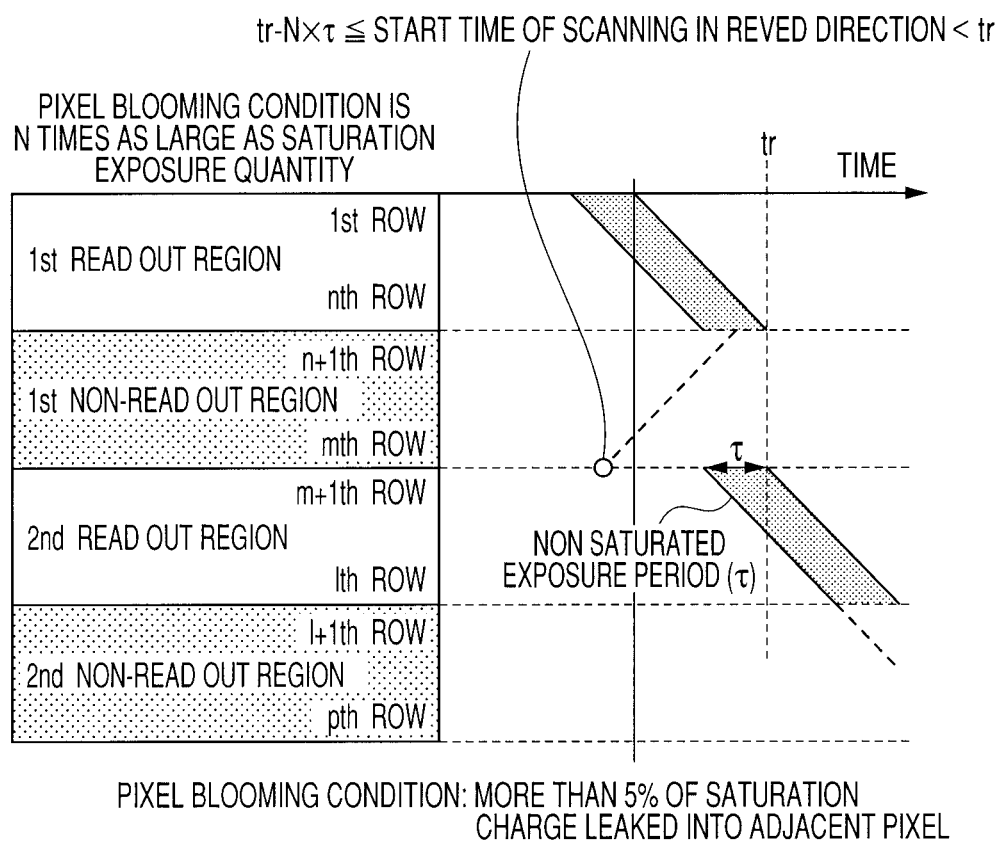
FIG. 24 is a conceptual operation diagram according to the present invention.

In FIG. 24, it is assumed that accumulation time τ for the pixels in the first and second read out regions is the maximum time in which the PDs do not saturate for a given amount of incident light. Also, when the accumulation time for the pixels in the first non-read out region is N or more times as large as τ, the influence of blooming on the pixels in the adjacent read out region is regarded as large.

The influence of blooming can be reduced if start time Tb of reset scanning of that row in the first non-read out region which adjoins the read out region satisfies the following condition in relation to start time tr of read out scanning of the read out region.

$$tr - N \times \tau \le Tb < tr \quad (1)$$

As an example in which the above condition is satisfied, FIG. 24 illustrates a conceptual diagram of operation in which reset scanning of the first non-read out region is performed in a direction opposite to the scanning direction of the first and second read out regions as in the case of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-026378, filed Feb. 6, 2009 which is hereby incorporated by reference herein in its entirety.

What is claimed is:

1. A solid-state imaging apparatus comprising:
a pixel region wherein a plurality of pixels each including a photoelectric converting unit for photoelectric conversion and a pixel output unit outputting a signal based on an electric charge accumulated in the photoelectric converting unit are arranged in a matrix; and
a row selecting unit for selecting the pixels, wherein the solid-state imaging apparatus further comprises a control unit
for controlling the row selecting unit in an operation mode such that:
the signals are read out from a first read out region including the pixels of a plurality of rows,
the signals are read out from a second read out region including the pixels of a plurality of rows, after the signals are read out from the plurality of rows of the first read out region, and
the signals are not read out from a non-read out region of the operation mode including the pixels of a plurality of rows and adjacent to the first and second read out regions, and the row selecting unit starts a reset operation of a row of the non-read out region, adjacent to the second read out region, during an accumulation period of the plurality of rows of the first read out region, and either starts simultaneously a reset operation of the pixels in a row of the non-read out region, adjacent to the first read out region, and the pixels in the row of the non-read out region, adjacent to the second read out region, or starts the reset operation of the pixels in a row of the non-read out region, adjacent to the first read out region, after the start of the reset operation of the pixels in the row of the non-read out region, adjacent to the second read out region.

2. The solid-state imaging apparatus according to claim 1, wherein the control unit starts the reset scanning from the row in the non-read out region and adjacent to the first read out region and continues the reset scanning in the same direction as a direction as read out scanning of the first and second readout regions and as a direction of shutter scanning, and starts the reset scanning of the non-readout region from the row adjacent to the second read out region and continues the reset scanning in a direction different from the direction of read out scanning of the first and second readout regions and different from the direction of shutter scanning.

3. The solid-state imaging apparatus according to claim 2, wherein
the control unit stops the reset scanning when an address of a pixel row reset by the reset scanning in the non-read out region in the same direction as that of the read out scanning and the shutter scanning of the first and second read out region coincides with an address of a pixel row reset by the reset scanning in the non-read out region in the direction different from that of the read out scanning and the shutter scanning of the first and second read out region, or
when a relation between the address of a pixel row reset by the reset scanning in the non-read out region and the shutter scanning in the same direction as that of the read out scanning of the first and second read out region and the address of a pixel row reset by the reset scanning in the non-read out region in the direction different from that of the read out scanning and the shutter scanning of the first and second read out region are reversed.

4. The solid-state imaging apparatus according to claim 1, wherein the control unit executes simultaneously the reset scanning all of the pixel rows in the non-read out region.

5. The solid-state imaging apparatus according to claim 1, wherein
the control unit includes a vertical scanning unit for scanning the pixel rows, and
the vertical scanning unit includes
an address generator for generating an address signal,
a decoder for selecting a bit corresponding to the address signal,
a storage unit storing the bit selected by the decoder and
a pixel driving unit supplying a signal to the pixel according to the bit stored in the storage unit.

6. The solid-state imaging apparatus according to claim 5, wherein the address generator includes
a plurality of counters, and
a selector for inputting to the decoder a count value of the plurality of counters.

7. The solid-state imaging apparatus according to claim 6, wherein the control unit inputs the count values of the plurality of counters successively through the selector to the decoder, to supply signals simultaneously to the plurality of pixel rows correspondingly to the plurality of bits.

8. The solid-state imaging apparatus according to claim 1, wherein the control unit executes the reset scanning of the non-read out region in a direction different from a direction of read out scanning of the first and second readout regions and different from a direction of shutter scanning.

9. The solid-state imaging apparatus according to claim 1, wherein the control unit controls such that a start time tr of the read out scanning of a row in the first or second read out region and adjacent to the non-read out region, and a start time Tb of the reset scanning of the row in the non-read out region and adjacent to the first or second read out region meet a condition: $tr - N \times \tau \le Tb < tr$, where $\tau$ is an accumulation time for the pixels in the first readout region or the second read out region.

10. The solid-state imaging apparatus according to claim 1, wherein the solid-state imaging apparatus is incorporated in an imaging system that includes:
an optical series for focusing an image onto the pixel region of the solid-state imaging apparatus; and
a video signal processing unit for processing a signal outputted from the solid-state imaging apparatus to generate an image data.

11. A driving method of a solid-state imaging apparatus that includes a pixel region wherein a plurality of pixels each including a photoelectric converting unit for photoelectric conversion and a pixel output unit outputting a signal based on an electric charge accumulated in the photoelectric converting unit are arranged in a matrix,
the driving method comprising:
reading out the signals from a first read out region including a plurality of rows of pixels,
reading out the signals from a second read out region including a plurality of rows of pixels, after the signals are read out from the first read out region, and without reading out the signals from a non-read out region including a plurality of rows of pixels and adjacent to the first and second read out regions,
starting a reset operation of a row of the non-read out region, adjacent to the second read out region, during an accumulation period of the plurality of rows of the first read out region, and
either starting simultaneously a reset operation of the pixels in a row of the non-read out region, adjacent to the first read out region, and the pixels in a row of the non-read out region, adjacent to the second read out region, or
starting the reset operation of the pixels in a row of the non-read out region, adjacent to the first read out region, after starting the reset operation of the pixels in a row of the non-read out region, adjacent to the second read out region.

12. The driving method according to claim 11, wherein
the reset scanning starting from the row in the non-read out region and adjacent to the first read out region continues in the same direction as a direction of read out scanning of the first and second readout regions and as a direction of shutter scanning, and
the reset scanning starting from the row in the non-read out region and adjacent to the second read out region continues in a direction different from the direction of read out scanning of the first and second readout regions and different from the direction of shutter scanning.

13. The driving method according to claim 12, wherein
the reset scanning stops when an address of a pixel row reset by the reset scanning and the shutter scanning in the same direction as that of the read out scanning of the first and second read out region coincides with an address of a pixel row reset by the reset scanning in the direction different from that of the read out scanning and the shutter scanning of the first and second read out region, or when a relation between the address of a pixel row reset by the reset scanning in the same direction as that of the read out scanning and the shutter scanning of the first and second read out region and the address of a pixel row reset by the reset scanning in the direction different from that of the read out scanning and the shutter scanning of the first and second read out region are reversed.

14. The driving method according to claim 11, wherein the reset scanning is performed simultaneously for all of the pixel rows in the non-read out region.

15. The driving method according to claim 11, wherein
the solid-state imaging apparatus includes a vertical scanning unit for scanning the pixel rows, and
the vertical scanning unit includes
an address generator for generating an address signal,
a decoder for selecting a bit corresponding to the address signal,
a storage unit storing the bit selected by the decoder and
a pixel driving unit supplying a signal to the pixel according to the bit stored in the storage unit.

16. The driving method according to claim 15, wherein the address generator includes
a plurality of counters, and
a selector for inputting to the decoder a count value of the plurality of counters.

17. The driving method according to claim 16, wherein the count values of the plurality of counters are inputted successively through the selector to the decoder, to supply signals simultaneously to the plurality of pixel rows correspondingly to the plurality of bits.

18. The driving method according to claim 11, wherein the reset scanning of the non-read out region continues in a direction different from a direction of read out scanning of the first and second readout regions and different from a direction of shutter scanning.

19. The driving method according to claim 11, wherein a start time tr of the read out scanning of a row in the first or second read out region and adjacent to the non-read out region, and a start time Tb of the reset scanning of the row in the non-read out region and adjacent to the first or second read out region are controlled to meet a condition: $tr-N\times\tau \leq Tb < tr$, wherein $\tau$ is an accumulation time for the pixels im the first read out region or the second read out region.

20. The driving method according to claim 11,
wherein the reset operation of the row of the non-readout region, adjacent to the second read out region is started between the start of the reset operation of the row of the first read out region, adjacent to the non-read out region, and the reading out of the row of the first read out region, adjacent to the non-read out region.

21. The driving method according to claim 11, wherein starting the reset operation of the row of the non-read out region, adjacent to the second read out region, after finishing a shutter scan of the first read out region.

* * * * *